(12) United States Patent
Okada

(10) Patent No.: US 12,671,917 B2
(45) Date of Patent: Jun. 30, 2026

(54) SOLID-STATE IMAGING ELEMENT, METHOD FOR CONTROLLING SOLID-STATE IMAGING ELEMENT, AND ELECTRONIC DEVICE

(71) Applicant: Sony Semiconductor Solutions Corporation, Kanagawa (JP)

(72) Inventor: Chihiro Okada, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 214 days.

(21) Appl. No.: 18/293,590

(22) PCT Filed: Jan. 31, 2022

(86) PCT No.: PCT/JP2022/003531
§ 371 (c)(1),
(2) Date: Jan. 30, 2024

(87) PCT Pub. No.: WO2023/042415
PCT Pub. Date: Mar. 23, 2023

(65) Prior Publication Data
US 2025/0113114 A1 Apr. 3, 2025

(30) Foreign Application Priority Data

Sep. 15, 2021 (JP) ................................. 2021-150086

(51) Int. Cl.
*H04N 25/77* (2023.01)
*G01S 7/481* (2006.01)
(Continued)

(52) U.S. Cl.
CPC ......... *H04N 25/771* (2023.01); *G01S 7/4816* (2013.01); *G01S 17/46* (2013.01);
(Continued)

(58) Field of Classification Search
CPC ........ H04N 25/77; H04N 25/78; H04N 25/51; H04N 25/778
(Continued)

(56) References Cited

U.S. PATENT DOCUMENTS

2016/0065942 A1* 3/2016 Park ..................... H04N 13/271
348/46
2016/0344969 A1* 11/2016 Furukawa .............. H04N 25/59

FOREIGN PATENT DOCUMENTS

JP 2002344809 A 11/2002
JP 2013247375 A 12/2013
(Continued)

OTHER PUBLICATIONS

International Search Report (PCT/ISA/210), International Application No. PCT/JP2022/003531, dated Apr. 5, 2022.

*Primary Examiner* — Jeffery A Williams
(74) *Attorney, Agent, or Firm* — Michael Best & Friedrich LLP

(57) ABSTRACT

To improve image quality in a solid-state imaging element using an indirect ToF system.

The solid-state imaging element includes a pixel signal generation unit, a first sample hold circuit, and a second sample hold circuit. The pixel signal generation unit generates a first pixel signal corresponding to an amount of charge transferred from a photoelectric conversion element to a first floating diffusion layer and a second pixel signal corresponding to an amount of charge transferred from the photoelectric conversion element to a second floating diffusion layer. The first sample hold circuit holds the first pixel signal. The second sample hold circuit holds the second pixel signal.

20 Claims, 32 Drawing Sheets

(51) Int. Cl.

| | | |
|---|---|---|
| *G01S 17/46* | (2006.01) | |
| *H04N 25/51* | (2023.01) | |
| *H04N 25/532* | (2023.01) | |
| *H04N 25/771* | (2023.01) | |
| *H04N 25/778* | (2023.01) | |
| *H04N 25/78* | (2023.01) | |

(52) U.S. Cl.
     CPC ........... *H04N 25/51* (2023.01); *H04N 25/532*
          (2023.01); *H04N 25/778* (2023.01); *H04N*
                                 *25/78* (2023.01)

(58) Field of Classification Search
     USPC ........................................................ 348/135
     See application file for complete search history.

(56)                    References Cited

FOREIGN PATENT DOCUMENTS

| | | | |
|---|---|---|---|
| JP | 2017201760 | A | 11/2017 |
| JP | 2018113606 | A | 7/2018 |
| JP | 2020013985 | A | 1/2020 |
| JP | 2020181932 | A * | 11/2020 |
| JP | 2021040048 | A | 3/2021 |
| WO | 2016013412 | A1 | 1/2016 |

* cited by examiner a b a b

SOLID-STATE IMAGING ELEMENT, METHOD FOR CONTROLLING SOLID-STATE IMAGING ELEMENT, AND ELECTRONIC DEVICE

TECHNICAL FIELD

The present technique relates to a solid-state imaging element. Specifically, the present technique relates to a solid-state imaging element for measuring a distance, a method for controlling the solid-state imaging element, and an electronic device.

BACKGROUND ART

Conventionally, in an electronic device having the function of ranging, a ranging system called an indirect ToF (Time of Flight) system has been used. The indirect ToF system is a system that acquires a plurality of exposure amounts by performing exposure in synchronization with a clock signal for driving a light source and indirectly determines the time of flight of light from the exposure amounts. In the indirect ToF system, a solid-state imaging element is proposed to temporarily hold charge in the gate capacity of a transistor before charge is transferred from a photoelectric conversion element to a floating diffusion layer (for example, see PTL 1).

CITATION LIST

Patent Literature

[PTL 1]
    JP 2020-13985A

SUMMARY

Technical Problem

In the conventional art, read noise is reduced by holding charge in the gate capacity. However, in the solid-state imaging element, signal leakage from the gate capacity during exposure buildup may deteriorate PLS (Parasitic Light Sensitivity) properties. Moreover, a saturation charge amount is rate-determined by the gate capacity and thus may cause an insufficient dynamic range. The deterioration of the PLS properties and the insufficient dynamic range may disadvantageously reduce the image quality of a depth map.

The present technique has been conceived in view of such circumstances. An object of the present technique is to improve image quality in a solid-state imaging element using the indirect ToF system.

Solution to Problem

The present technique has been devised to solve the problem. A first aspect of the present technique is a solid-state imaging element including: a pixel signal generation unit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer; a first sample hold circuit that holds the first pixel signal; and a second sample hold circuit that holds the second pixel signal, and a method for controlling the solid-state imaging element. This provides the effect of improving the image quality of a frame.

In the first aspect, the first and second sample hold circuits may each include: a first capacitive element; a second capacitive element with one end connected to the first capacitive element; a first sampling transistor that opens or closes a path between the connection node of the first and second capacitive elements and the pixel signal generation unit; a pre-amplification transistor; and a second sampling transistor that opens or closes a path between the other end of the second capacitive element and a predetermined reference voltage. This provides the effect of holding the pixel signal in the second capacitive element.

In the first aspect, one of the first and second sample hold circuits may further include a reading circuit for sequentially reading the first and second pixel signals, and the first and second sample hold circuits may share the reading circuit. This provides the effect of reducing the circuit size.

In the first aspect, the first and second sample hold circuits may each include: a first capacitive element; a first sampling transistor that opens or closes a path between one end of the first capacitive element and the pixel signal generation unit; a second capacitive element; and a second sampling transistor that opens or closes a path between one end of the second capacitive element and the pixel signal generation unit. This provides the effect of improving the reading speed.

In the first aspect, the first and second sample hold circuits may each include: a first capacitive element; a first sampling transistor that opens or closes a path between one end of the first capacitive element and the pixel signal generation unit; a second capacitive element; and a second sampling transistor that opens or closes a path between one end of the first capacitive element and one end of the second capacitive element. This provides the effect of eliminating the need for a reference voltage.

In the first aspect, the first and second sample hold circuits may each include: a first capacitive element with one end connected to the pixel signal generation unit; a second capacitive element; a first sampling transistor that opens or closes a path between the other end of the first capacitive element and one end of the second capacitive element; and a second sampling transistor that opens or closes a path between one end of the second capacitive element and a predetermined power supply voltage. This provides the effect of eliminating the need for a reference voltage.

In the first aspect, the first and second sample hold circuits may each include: first and second capacitive elements with one ends connected in common to the pixel signal generation unit; a first sampling transistor that opens or closes a path between the other end of the first capacitive element and a predetermined node; a second sampling transistor that opens or closes a path between the other end of the second capacitive element and the predetermined node; and a third sampling transistor that opens or closes a path between the predetermined node and a predetermined power supply voltage. This provides the effect of reducing noise.

The first aspect may further include a vertical scanning circuit that drives a predetermined number of pixels, wherein the pixel signal generation unit and the first and second sample hold circuits may be disposed in each of the pixels, and the vertical scanning circuit may simultaneously expose all the pixels, hold the first and second pixel signals, and output the first and second pixel signals for each row. This provides the effect of exposure according to a global shutter system.

In the first aspect, the first and second pixel signals may each include a reset level and a signal level, and the vertical scanning circuit may output the reset level before exposure. This provides the effect of improving the reading speed.

In the first aspect, the vertical scanning circuit may output the first and second pixel signals during exposure. This provides the effect of reading the pixel signals in a nondestructive manner.

The first aspect may further include an exposure time control unit that controls an exposure time on the basis of the first and second pixel signals outputted during exposure. This provides the effect of setting a proper exposure time.

The first aspect may further include an analog-digital converter that performs analog-digital conversion on the first and second pixel signals; and a gain control unit that controls the analog gain of the analog-digital converter on the basis of the first and second pixel signals outputted during exposure. This provides the effect of setting a proper analog gain.

In the first aspect, a part of the pixel signal generation unit may be disposed in a first chip, and the other part of the pixel signal generation unit and the first and second sample hold circuits may be disposed in a second chip. This provides the effect of increasing the areas of a photoelectric conversion element and a transistor.

In the first aspect, a part of the pixel signal generation unit and parts of the first and second sample hold circuits may be disposed in a first chip, and the other parts of the first and second sample hold circuits may be disposed in a second chip. This provides the effect of reducing the circuit size of the second chip.

In the first aspect, the pixel signal generation unit and the first and second sample hold circuits may each include a source follower circuit. This provides the effect of reading a signal through the source follower circuit.

In the first aspect, the pixel signal generation unit and the first and second sample hold circuits may each include a source ground circuit. This provides the effect of reading a signal through the source ground circuit.

In the first aspect, the first and second sample hold circuits may each include a predetermined number of capacitive elements, and each of the capacitive elements may be one of a MIM (Metal-Insulator-Metal) capacitor, a MOM (Metal-Oxide-Metal) capacitor, a MOS (Metal-Oxide-Semiconductor) capacitor, a DRAM (Dynamic Random Access Memory) cell capacitor, and CDTI (Capacitive Deep Trench Isolation). This provides the effect of holding the pixel signal in the MIM capacitor or the like.

A second aspect of the present technique is an electronic device including: a pixel signal generation unit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer; a first sample hold circuit that holds the first pixel signal; a second sample hold circuit that holds the second pixel signal; and a ranging operation unit that generates distance information on the basis of the first and second pixel signals.

This provides the effect of improving the image quality of a depth map.

DESCRIPTION OF EMBODIMENTS

Modes for carrying out the present technique (hereinafter also referred to as "embodiments") will be described below. The description will be given in the following order.
  1. First Embodiment (an example in which a sample hold circuit is provided for each pixel)
  2. Second Embodiment (an example in which a sample hold circuit is provided with a different circuit configuration for each pixel)
  3. Third Embodiment (an example in which a sample hold circuit is provided for each pixel in a laminated structure)
  4. Fourth Embodiment (an example in which a plurality of sample hold circuits sharing a circuit are provided for each pixel)
  5. Example of Application to Moving Object 1. First Embodiment

Figure 1:
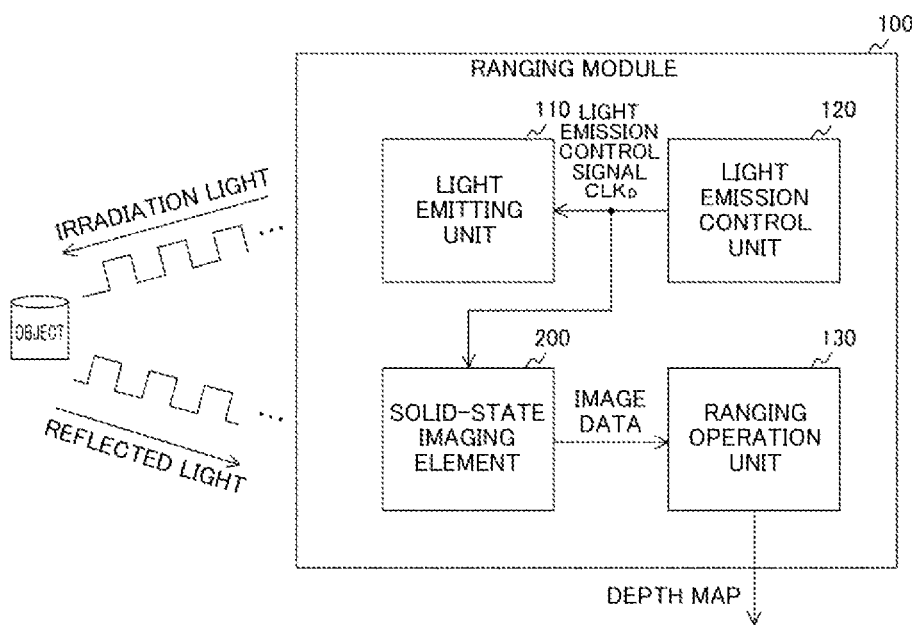
FIG. 1 is a block diagram showing a configuration example of a ranging module according to a first embodiment of the present technique.

[Configuration Example of Ranging Module]
FIG. 1 is a block diagram illustrating a configuration example of a ranging module 100 according to a first embodiment of the present technique. The ranging module 100 is configured to measure a distance by an indirect ToF system and includes a light emitting unit 110, a light emission control unit 120, a solid-state imaging element 200, and a ranging operation unit 130. The ranging module 100 is an example of an electronic device described in the claims.

The light emitting unit 110 is configured to emit irradiation light with periodically fluctuating brightness and irradiate an object with the irradiation light. The light emitting unit 110 generates irradiation light in synchronization with, for example, a light emission control signal CLKp of a rectangular wave. For example, a light-emitting diode is used as the light emitting unit 110, and near-infrared light or the like is used as the irradiation light. The light emission control signal CLKp is not limited to a rectangular wave if the signal is a periodic signal. For example, the light emission control signal CLKp may be a sine wave.

The light emission control unit 120 is configured to control the light emitting unit 110. The light emission control unit 120 generates the light emission control signal CLKp and supplies the signal to the light emitting unit 110 and the solid-state imaging element 200. The frequency of the light emission control signal CLKp is, for example, 20 megahertz (MHz). The frequency of the light emission control signal CLKp is not limited to 20 megahertz (MHz) and may be, for example, 5 megahertz (MHz).

The solid-state imaging element 200 is configured to receive light reflected from an object and capture an image of image data in synchronization with a vertical synchronization signal VSYNC. For example, a periodic signal of 60 hertz (Hz) is used as the vertical synchronization signal VSYNC. The solid-state imaging element 200 supplies the captured image of the image data (frame) to the ranging operation unit 130. The frequency of the vertical synchronization signal VSYNC is not limited to 60 hertz (Hz) and may be 30 hertz (Hz) or 120 hertz (Hz).

The ranging operation unit 130 is configured to measure a distance to an object on the basis of an image signal according to the indirect ToF system. The ranging operation unit 130 measures a distance for each pixel circuit and generates, for each pixel, a depth map indicating a distance to the object as a grayscale value. The depth map is used for, for example, image processing for blurring to a degree corresponding to the distance or AF (Auto Focus) processing for determining the focal point of a focus lens according to the distance.

Figure 2:
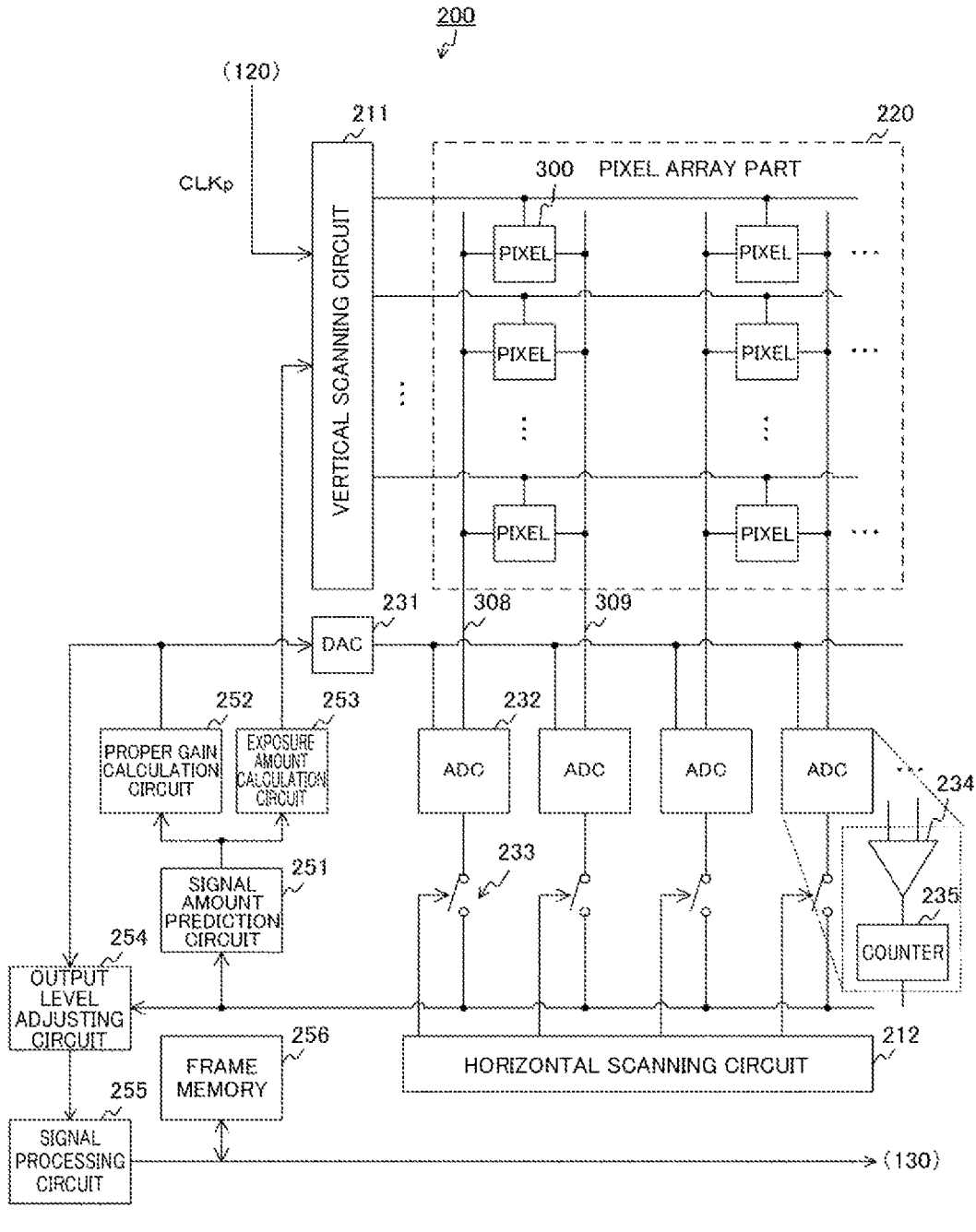
FIG. 2 is a block diagram showing a configuration example of a solid-state imaging element according to the first embodiment of the present technique.

[Configuration Example of Solid-State Imaging Element]
FIG. 2 is a block diagram illustrating a configuration example of the solid-state imaging element 200 according to the first embodiment of the present technique. The solid-state imaging element 200 includes a vertical scanning circuit 211, a pixel array part 220, and a horizontal scanning circuit 212. Moreover, the solid-state imaging element 200 includes a DAC (Digital to Analog Converter) 231, a plurality of ADCs (Analog to Digital Converters) 232, and a plurality of switches. Furthermore, the solid-state imaging element 200 includes a signal amount prediction circuit 251, a proper gain calculation circuit 252, an exposure amount calculation circuit 253, an output level adjusting circuit 254, a signal processing circuit 255, and a frame memory 256. These circuits are provided in a single semiconductor chip.

In the pixel array part 220, a plurality of pixels 300 are arranged in a two-dimensional lattice pattern. Hereinafter, a set of the pixels 300 arranged in a predetermined direction will be referred to as a "row", and a set of the pixels 300 arranged in a direction perpendicular to the row will be referred to as a "column". In the pixel array part 220, two vertical signal lines are disposed for each column. Moreover, each column is provided with two of the ADCs 232 and two of the switches 233.

In this case, a normal mode or a nondestructive reading mode is set for the solid-state imaging element 200.

The vertical scanning circuit 211 is configured to simultaneously expose all rows in the normal mode over an exposure period set by the exposure amount calculation circuit 253 and sequentially select the rows to output pixel signals after the completion of exposure. If the nondestructive reading mode is set, the vertical scanning circuit 211 further outputs pixel signals from all the rows with predetermined timing during exposure. In other words, the pixel signals are read during exposure. The reading does not initialize (that is, destroy) a charge amount in exposure buildup in the pixel. Hereinafter, the reading during exposure will be referred to as "nondestructive reading".

The pixels 300 are configured to receive reflected light under the control of the vertical scanning circuit 211 and generate the pixel signals according to the exposure amounts. The pixels 300 each generate a pair of analog pixel signals and output the signals to a pair of vertical signal lines of the corresponding column.

The ADC 232 is configured to perform AD (Analog to Digital) conversion on the pixel signals of the corresponding column. As the ADC 232, a single-slope ADC including a comparator 234 and a counter 235 is used. The comparator 234 is configured to compare a lamp signal from the DAC 231 and the corresponding pixel signal and output the comparison result to the counter 235. The counter 235 is configured to count a counter value in a period before the comparison result is reversed, and output a digital signal indicating the value to the switch 233.

Hereinafter, the level of the pixel signal at the time of the initialization of the pixel 300 will be referred to as "reset level", and the level of the pixel signal according to an exposure amount will be referred to as "signal level". The ADC 232 performs CDS (Correlated Double Sampling) processing for determining a difference between the reset level and the signal level, in addition to AD conversion. For example, the counter 235 counts down when the reset level is converted, whereas the counter 235 counts up when the signal level is converted. CDS processing is performed by the control. Alternatively, the counter 235 may only count up or count down and a circuit downstream the counter 235 (e.g., the signal processing circuit 255) may perform CDS processing.

The DAC 231 is configured to generate the lamp signal and supply the signal to each of the ADCs 232. The gentler the slope of the lamp signal, the larger the analog gain of the ADC 232. The slope of the lamp signal controlled to set the analog gain of the ADC 232 at a value set by the proper gain calculation circuit 252.

The switch 233 is configured to supply a digital signal to the signal amount prediction circuit 251 and the output level adjusting circuit 254 under the control of the horizontal scanning circuit 212.

The horizontal scanning circuit 212 is configured to sequentially drive the plurality of switches 233 and output the digital signal.

The signal amount prediction circuit 251 is configured to predict, when the nondestructive reading mode is set, a signal level at the completion of exposure from a signal level outputted during exposure. The signal amount prediction circuit 251 supplies the predicted signal level to the proper gain calculation circuit 252 and the exposure amount calculation circuit 253.

The proper gain calculation circuit 252 is configured to calculate a proper analog gain on the basis of a signal level outputted during exposure. The proper gain calculation circuit 252 sets the calculated value as another analog gain and supplies the analog gain to the DAC 231 and the output level adjusting circuit 254. The proper gain calculation circuit 252 is an example of an analog gain control unit described in the claims.

The exposure amount calculation circuit 253 calculates a proper exposure time on the basis of a signal level outputted during exposure. For example, the time is calculated such that the signal level is not saturated before the completion of exposure. The exposure amount calculation circuit 253 sets the calculated time as another exposure time and supplies the exposure time to the vertical scanning circuit 211. The exposure amount calculation circuit 253 is an example of an exposure time control unit described in the claims.

The output level adjusting circuit 254 is configured to adjust the level of a digital signal on the basis of the analog gain set by the proper gain calculation circuit 252. The output level adjusting circuit 254 supplies the adjusted digital signal to the signal processing circuit 255.

The signal processing circuit 255 is configured to perform various kinds of signal processing including dark current correction on the digital signal. The signal processing circuit 255 supplies image data (frame), in which processed digital signals are arranged, to the frame memory 256 and the ranging operation unit 130.

The frame memory 256 is configured to temporarily hold the frame.

The solid-state imaging element 200 that calculates both of a proper analog gain and a proper exposure time may calculate only one of the analog gain and the exposure time. In this case, one of the proper gain calculation circuit 252 and the exposure amount calculation circuit 253 is not necessary.

The solid-state imaging element 200 that reads a signal level in the nondestructive reading mode during exposure may be configured not to read the signal level during exposure. In this case, the signal amount prediction circuit 251, the proper gain calculation circuit 252, the exposure amount calculation circuit 253, and the output level adjusting circuit 254 are not necessary.

[Configuration Example of Pixel]

Figure 3:
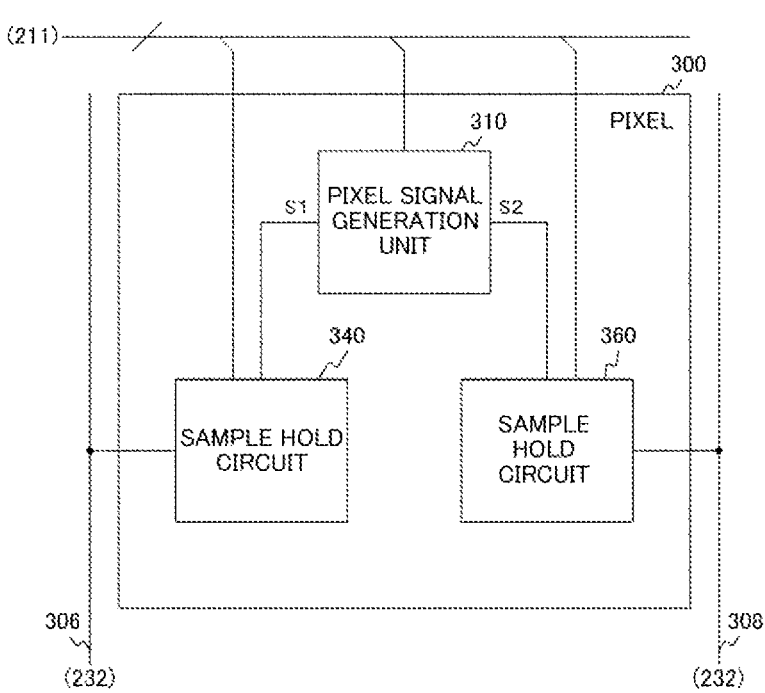
FIG. 3 is a block diagram showing a configuration example of a pixel according to the first embodiment of the present technique.

FIG. 3 is a block diagram illustrating a configuration example of the pixel 300 according to the first embodiment of the present technique. The pixel 300 includes a pixel signal generation unit 310 and sample hold circuits 340 and 360.

The pixel signal generation unit 310 is configured to generate pixel signals S1 and S2 for different floating diffusion layers serving as transfer destinations. The pixel signal generation unit 310 supplies the pixel signal S1 to the sample hold circuit 340 and supplies the pixel signal S2 to the sample hold circuit 360.

The sample hold circuit 340 is configured to hold the pixel signal S1. The sample hold circuit 340 outputs the held pixel signal S1 to a vertical signal line 306 under the control of the vertical scanning circuit 211. The sample hold circuit 360 is configured to hold the pixel signal S2. The sample hold circuit 360 outputs the held pixel signal S2 to a vertical signal line 308 under the control of the vertical scanning circuit 211. The sample hold circuits 340 and 360 are examples of first and second sample hold circuits described in the claims.

[Configuration Example of Pixel Signal Generation Unit]

Figure 4:
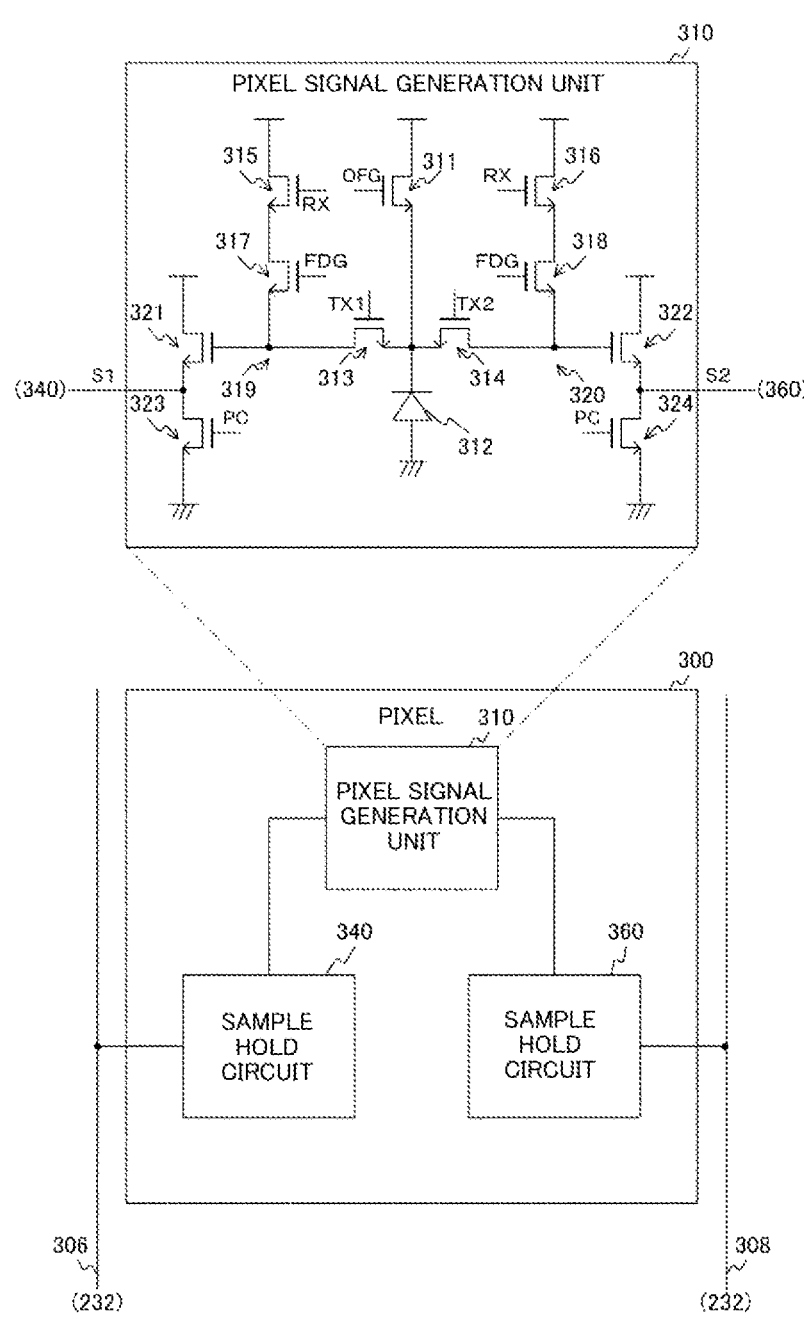
FIG. 4 is a circuit diagram showing a configuration example of a pixel signal generation unit according to the first embodiment of the present technique.

FIG. 4 is a circuit diagram showing a configuration example of the pixel signal generation unit 310 according to the first embodiment of the present technique. The pixel signal generation unit 310 includes a discharge transistor 311, a photoelectric conversion element 312, transfer transistors 313 and 314, pre-reset transistors 315 and 316, and conversion efficiency control transistors 317 and 318. Furthermore, the pixel signal generation unit 310 includes floating diffusion layers 319 and 320, pre-amplification transistors 321 and 322, and pre-current source transistors 323 and 324. As a transistor in the pixel signal generation unit 310, for example, an nMOS (n-channel Metal Oxide Semiconductor) transistor is used.

The discharge transistor 311 is configured to discharge charge from the photoelectric conversion element 312 in accordance with a discharge signal OFG from the vertical scanning circuit 211. The photoelectric conversion element 312 is configured to convert received reflected light into charge.

The transfer transistor 313 is configured to transfer charge from the photoelectric conversion element 312 to the floating diffusion layer 319 in accordance with a transfer signal TX1 from the vertical scanning circuit 211. The transfer transistor 314 is configured to transfer charge from the photoelectric conversion element 312 to the floating diffusion layer 320 in accordance with a transfer signal TX2 from the vertical scanning circuit 211.

The pre-reset transistor 315 is configured to initialize the floating diffusion layer 319 in accordance with a reset signal RX from the vertical scanning circuit 211. The pre-reset transistor 316 is configured to initialize the floating diffusion layer 320 in accordance with the reset signal RX from the vertical scanning circuit 211.

The conversion efficiency control transistors 317 and 318 are configured to switch charge-to-voltage conversion efficiency in two steps in accordance with a discharge signal FDG from the vertical scanning circuit 211. If the switching of conversion efficiency is not necessary, the provision of the conversion efficiency control transistors 317 and 318 may be eliminated. The floating diffusion layers 319 and 320 are configured to convert charge into voltage.

The pre-amplification transistor 321 is configured to amplify the voltage of the floating diffusion layer 319 and output the voltage as the pixel signal S1 to the sample hold circuit 340. The pre-amplification transistor 322 is configured to amplify the voltage of the floating diffusion layer 320 and output the voltage as the pixel signal S2 to the sample hold circuit 360. The drains of the pre-amplification transistors 321 and 322 are connected to a power supply voltage and act as source follower circuits.

The pre-current source transistors 323 and 324 are configured to supply a current corresponding to a control signal PC.

With the foregoing circuit configuration, the pixel signal generation unit 310 generates the pixel signal S1 corresponding to an amount of charge transferred from the photoelectric conversion element 312 to the floating diffusion layer 319 and the pixel signal S2 corresponding to an amount of charge transferred from the photoelectric conversion element 312 to the floating diffusion layer 320. The floating diffusion layers 319 and 320 are examples of first and second floating diffusion layers described in the claims.

[Configuration Example of Sample Hold Circuit]

Figure 5:
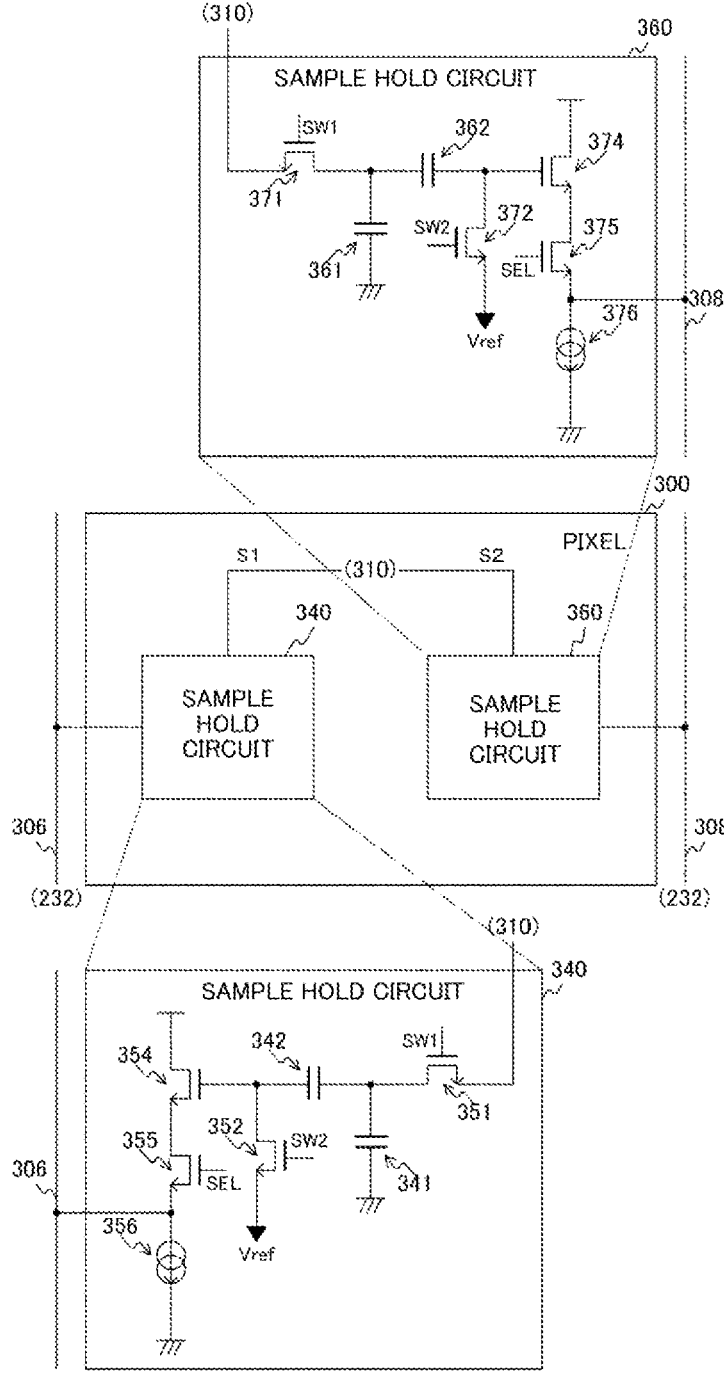
FIG. 5 is a circuit diagram showing a configuration example of a sample hold circuit according to the first embodiment of the present technique.

FIG. 5 is a circuit diagram showing a configuration example of the sample hold circuits 340 and 360 according to the first embodiment of the present technique. The sample hold circuit 340 includes capacitive elements 341 and 342, sampling transistors 351 and 352, a post-amplification transistor 354, a selection transistor 355, and a post-current source transistor 356. As a transistor in the sample hold circuit 340, for example, an nMOS transistor is used.

As the capacitive elements 341 and 342, for example, MIM (Metal-Insulator-Metal) capacitors are used. In addition to MIM capacitors, a MOS (Metal-Oxide-Semiconductor) capacitor or a DRAM (Dynamic Random Access Memory) cell capacitor may be used. Alternatively, CDTI (Capacitive Deep Trench Isolation) may be used. In this case, a DRAM cell capacitor indicates a capacitor in the memory cell of DRAM. In addition, the capacitive elements 341 and 342 are examples of first and second capacitive elements described in the claims.

The capacitive element 341 is inserted between one end of the capacitive element 342 and a ground terminal. The other end of the capacitive element 342 is connected to the gate of the post-amplification transistor 354.

The sampling transistor 351 opens or closes a path between the pixel signal generation unit 310 and the connection node of the capacitive elements 341 and 342 in accordance with a control signal SW1 from the vertical scanning circuit 211. The sampling transistor 352 opens or closes a path between the other end of the capacitive element 342 and a reference voltage Vref in accordance with a control signal SW2 from the vertical scanning circuit 211. The sampling transistors 351 and 352 are examples of first and second sampling transistors described in the claims.

The post-amplification transistor 354, the selection transistor 355, and the post-current source transistor 356 are inserted in series between the power supply voltage and the ground terminal. The drain of the post-amplification transistor 354 is connected to the power supply voltage and acts as a source follower circuit.

The selection transistor 355 supplies the pixel signal S1 held in the capacitive element 342 to the vertical signal line 306 in accordance with a selection signal SEL from the vertical scanning circuit 211.

The sample hold circuit 360 includes capacitive elements 361 and 362, sampling transistors 371 and 372, a post-amplification transistor 374, a selection transistor 375, and a post-current source transistor 376. The circuit configuration of the sample hold circuit 360 is identical to that of the sample hold circuit 340. However, the pixel signal S2 is inputted to the sample hold circuit 360, and the held pixel signal S2 is outputted to the vertical signal line 308.

As shown in FIGS. 4 and 5, a voltage is held in the capacitive element 341 or 342 and thus achieves proper PLS properties. This reduces a ranging error caused by deteriorated PLS. Moreover, a charge is held in the floating diffusion layers 319 and 320 without using a gate capacity, so that a saturation charge amount is not rate-determined by the gate capacity, facilitating the extension of a dynamic range. The improvement of the PLS properties and the extension of the dynamic range enhance the image quality of a depth map.

Figure 6:
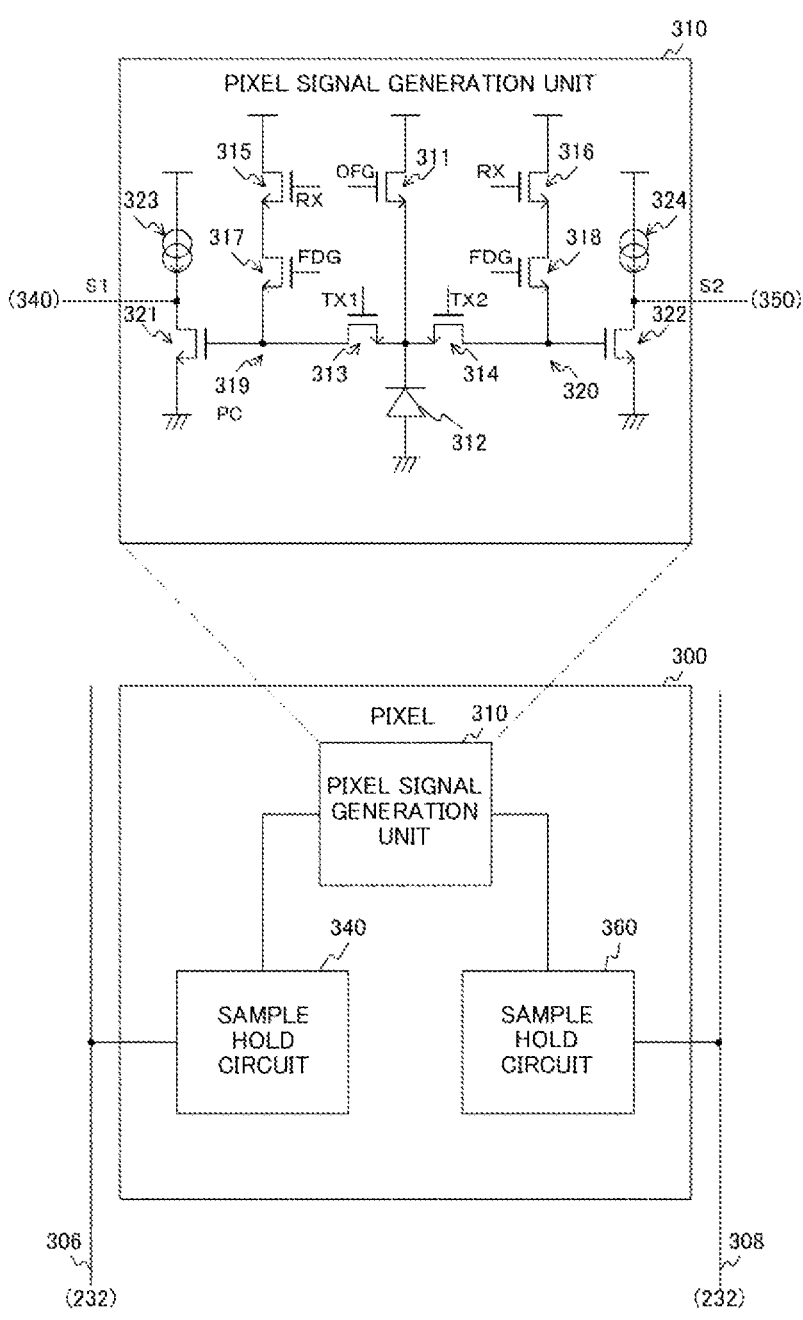
FIG. 6 is a circuit diagram showing a configuration example of the pixel signal generation unit of source ground according to the first embodiment of the present technique.
Figure 7:
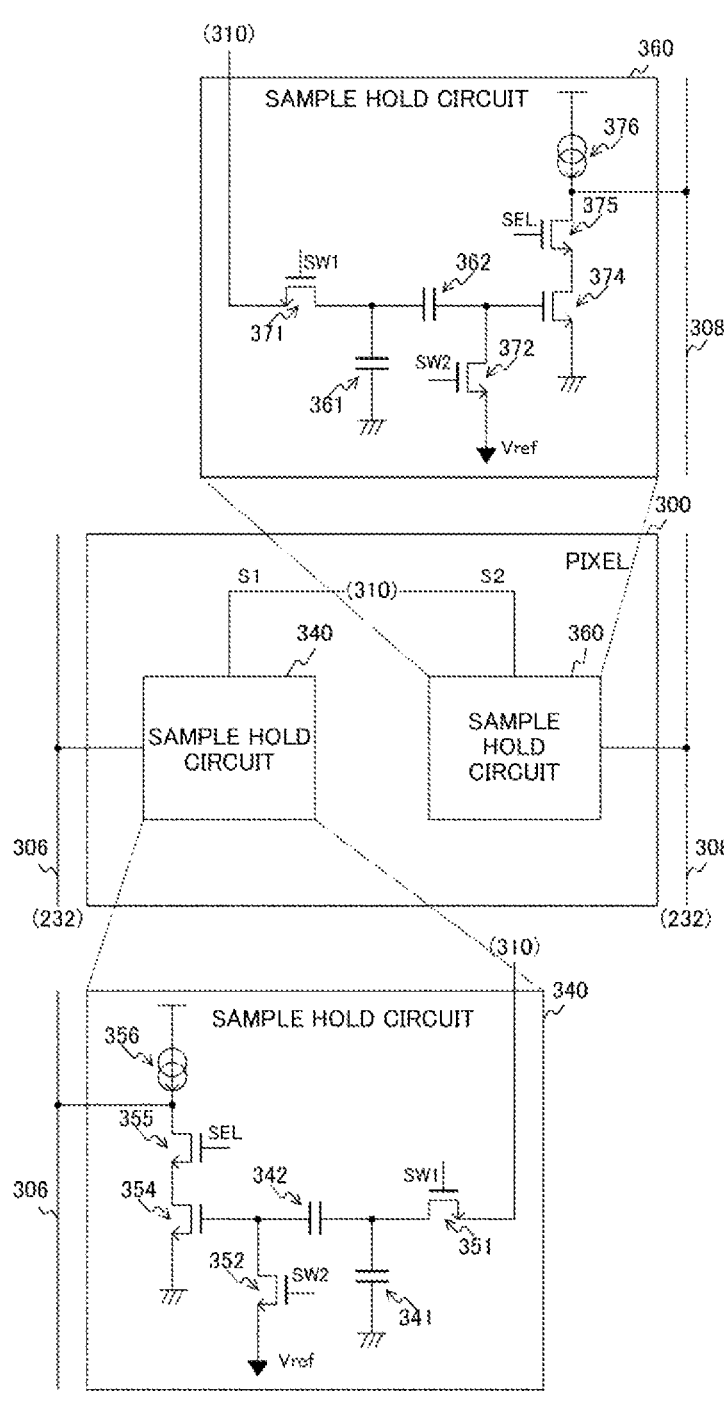
FIG. 7 is a circuit diagram showing a configuration example of a sample hold circuit of source ground according to the first embodiment of the present technique.

In FIGS. 4 and 5, the source follower circuit is disposed in the pixel. A source ground circuit may be disposed instead of the source follower circuit. In this case, as shown in FIG. 6, the sources of the pre-amplification transistors 321 and 322 are grounded and act as source ground circuits. As shown in FIG. 7, the sources of the post-amplification transistors 354 and 374 are grounded and act as source ground circuits.

11

12

[Operation Example of Solid-State Imaging Element]

Figure 8:
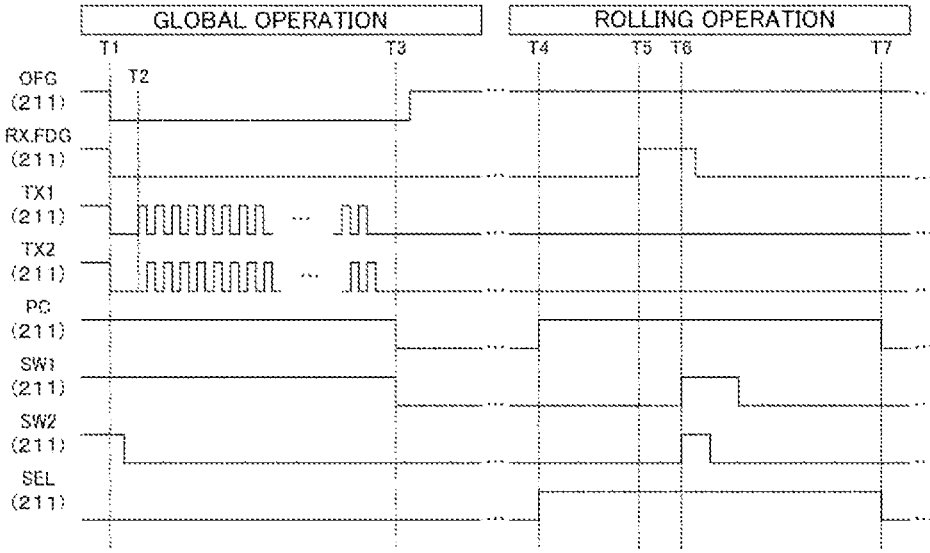
FIG. 8 is a timing chart showing an example of an operation of the solid-state imaging element according to the first embodiment of the present technique.

FIG. 8 is a timing chart showing an example of an operation of the solid-state imaging element 200 according to the first embodiment of the present technique. In FIG. 8, it is assumed that the normal mode not involving nonde- structive reading is set.

At timing T1, the vertical scanning circuit 211 shifts the discharge signal OFG, the reset signal RX, the control signal FDG, the transfer signal TX1, and the transfer signal TX2 from a high level to a low level in all rows. At this point, the control signals PC, SW1, and SW2 in all rows are set at the high level. Under the control, the capacitive elements 342 and 362 are charged by the reset level and the reference voltage Vref. Immediately after timing T1, the control signal SW2 is controlled to the low level in all the rows, and the reset level is subjected to sampling and holding.

In a period from timing T2 to the lapse of an exposure time, the vertical scanning circuit 211 periodically turns on or off the transfer signals TX1 and TX2 in all the rows. For example, in the exposure time, a periodic signal with the same frequency as the light emission control signal CLKp and a phase difference of 0° is supplied as the transfer signal TX1. Moreover, in the exposure time, a periodic signal with the same frequency as the light emission control signal CLKp and a phase difference of 180° is supplied as the transfer signal TX2. Thus, all the rows (all the pixels) are exposed and a charge is accumulated with the passage of the exposure time. Charge is allocated to the floating diffusion layers 319 and 320, and the levels of the pixel signals S1 and S2 decrease according to the amounts of charge.

At timing T3 immediately after the completion of expo- sure, the vertical scanning circuit 211 sets the control signal PC and the SW1 at the low level. Thus, the gate of the source follower circuit (post-amplification transistors 354 and 374) has a potential of (Vref-Vsig) where Vsig indicates a net signal level obtained by CDS processing, which will be described later. Moreover, the signal level of (Vref-Vsig- Vth) is kept and is outputted from the vertical signal lines 306 and 308. Vth indicates the threshold voltages of the post-amplification transistors 354 and 374. Immediately after timing T3, the discharge signal OFG is controlled to the high level.

After a global operation for exposing all the pixels, a rolling operation is performed to sequentially read the rows. In the rolling operation, a reading period for a predetermined selected row is a period from timing T4 to T7.

In the period from timing T4 to T7, the vertical scanning circuit 211 sets the selection signal SEL and the control signal PC at the high level in the selected row. Moreover, in a period from timing T4 to T5, the ADC 232 of each column converts (Vref-Vsig-Vth) of the vertical signal line into a digital signal as a signal level. Thus, the signal level is read.

For a predetermined period from timing T5, the vertical scanning circuit 211 sets the reset signal RX and the control signal FDG at the high level. At timing T6, the vertical scanning circuit 211 sets the control signals SW1 and SW2 at the high level and sequentially sets the control signals SW2 and SW1 at the low level immediately after the setting to the high level. The ADC 232 in each column converts (Vref-Vth) of the vertical signal line into a digital signal as a reset level. Thus, the reset level is read.

The ADC 232 performs CDS processing for determining a difference between the reset level and the signal level as the net signal level Vsig. When a signal level Vsig corre- sponding to the transfer signal TX1 is denoted as Q1and a signal level Vsig corresponding to the transfer signal TX2 is denoted as Q2, image data including Q1 and Q2 is outputted for each pixel to the ranging operation unit 130.

The ranging operation unit 130 determines a distance d for each pixel according to the following equation:

$$d = \left(c \times L_{PW}/2\right) \times \left\{Q1/(Q1 + Q2)\right\}$$

In the equation, c is the speed of light and $L_{PW}$ is the pulse width of irradiation light.

As described above, a method of allocating charge by two transfer signals is called 2-Phase method. Moreover, 4-phase method of allocating charge by four transfer signals may be used instead. When 4-phase method is used, floating diffu- sion layers and transistors other than the discharge transistor 311 and the photoelectric conversion element 312 serve as a four-system in the pixel 300.

Moreover, with a circuit configuration for holding a voltage in the sample hold circuit, the solid-state imaging element 200 can also perform nondestructive reading during exposure.

Figure 9:
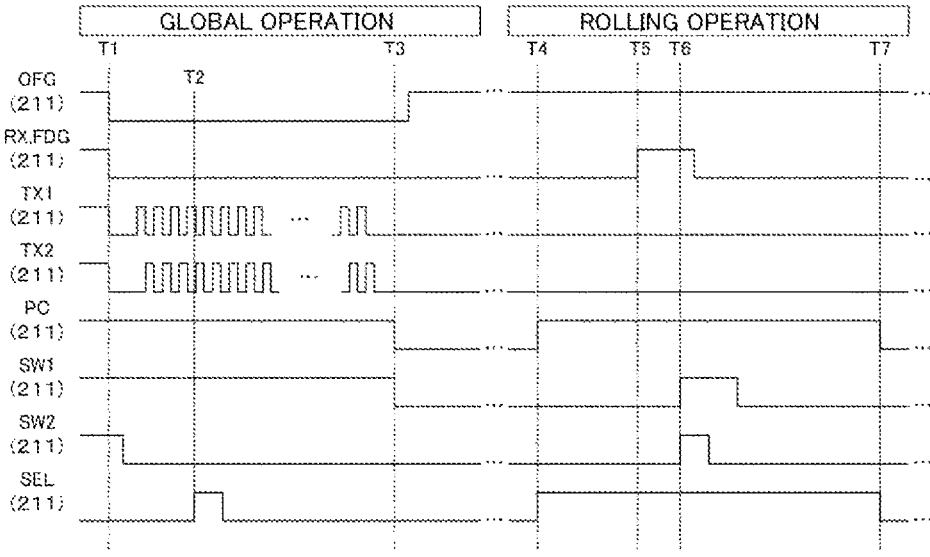
FIG. 9 shows an example of a timing chart of nondestructive reading according to the first embodiment of the present technique.

FIG. 9 shows an example of a timing chart of nondestruc- tive reading according to the first embodiment of the present technique. When the nondestructive reading mode is set, the vertical scanning circuit 211 sequentially selects the rows during exposure. For example, at timing T2 during exposure, the selection signal SEL is supplied to a predetermined selected row. Thereafter, the solid-state imaging element 200 reads the reset level and the signal level of the selected row and performs CDS processing. Thus, the signal amount prediction circuit 251 can predict the signal level at the completion of exposure. On the basis of the predicted value, the proper gain calculation circuit 252 and the exposure amount calculation circuit 253 can calculate a proper analog gain and a proper exposure time.

Figure 10:
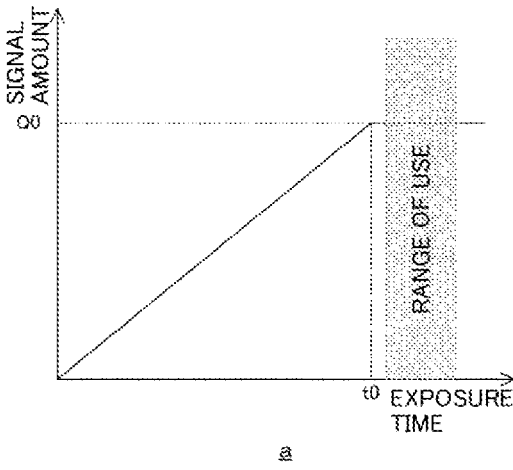
FIG. 10 is an explanatory drawing showing a method of adjusting an exposure time according to the first embodiment of the present technique.
Figure 10:
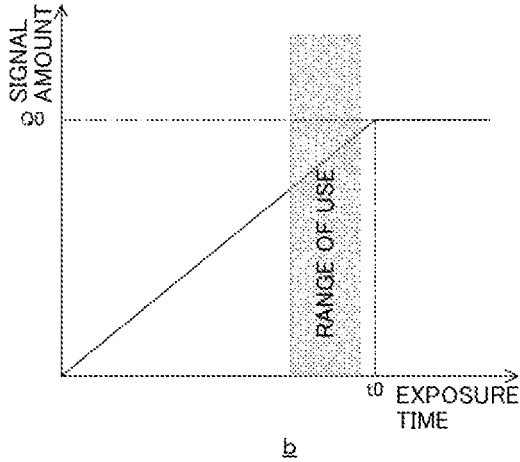

FIG. 10 is an explanatory drawing showing a method of adjusting an exposure time according to the first embodi- ment of the present technique. "a" in FIG. 10 shows an example of the relationship between an exposure time and a signal amount in the normal mode. The signal amount indicates a reduction in signal level. "b" in FIG. 10 shows an example of the relationship between an exposure time and a signal amount in the nondestructive reading mode. In "a" and "b" of FIG. 10, the vertical axis indicates a signal amount and the horizontal axis indicates an exposure time.

As shown in "a" of FIG. 10, in the range of a signal amount of Q0 or less, a signal amount increases in propor- tion to an exposure time. t0 denotes an exposure time when the signal amount reaches Q0. In a time range of t0 or more, the signal amount does not exceed Q0 and becomes satu- rated. The amount of received light fluctuates depending upon the environment, so that the time to is not always kept constant. Thus, for example, if a time range of time t0 or more is used as an exposure time in the normal mode, an exposure time and a signal amount are not proportionate to each other. This may cause an error of a measured value.

Thus, as shown in "b" of FIG. 10, the signal amount prediction circuit 251 in the nondestructive reading mode predicts a signal amount at the completion of exposure from a signal amount during exposure, and the exposure amount calculation circuit 253 adjusts an exposure time to prevent the saturation of a signal amount at the completion of exposure. This can suppress the saturation of a signal amount and reduce a ranging error.

Figure 11:
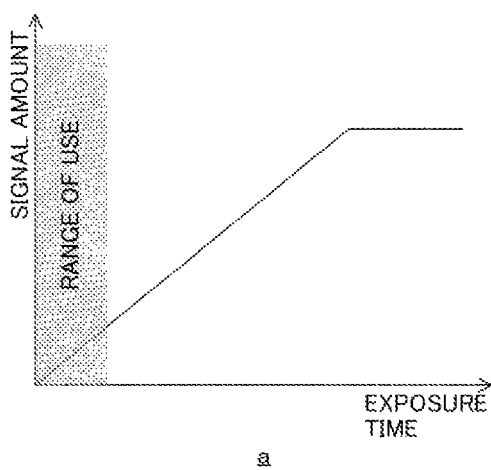
FIG. 11 is an explanatory drawing showing a method of adjusting an analog gain according to the first embodiment of the present technique.
Figure 11:
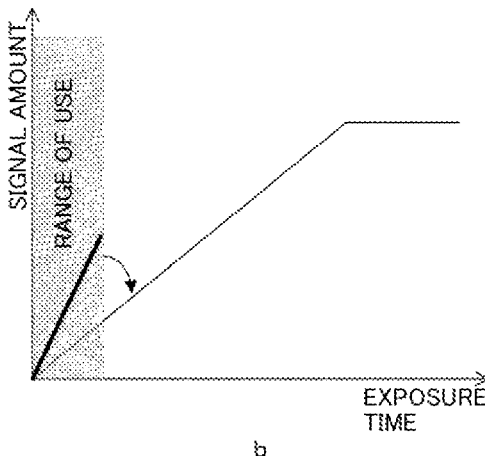

FIG. 11 is an explanatory drawing showing a method of adjusting an analog gain according to the first embodiment of the present technique. "a" in FIG. 11 shows an example of the relationship between an exposure time and a signal amount in the normal mode. "b" in FIG. 11 shows an example of the relationship between an exposure time and a signal amount in the nondestructive reading mode. In "a" and "b" of FIG. 11, the vertical axis indicates a signal amount and the horizontal axis indicates an exposure time. A thin line indicates characteristics when an analog gain has an initial value, whereas a thick line indicates characteristics when an analog gain is adjusted.

As shown in "a" of FIG. 11, when an analog gain has an initial value, a signal amount may be small in a short exposure time and thus an SN (Signal-Noise) ratio may decrease.

Thus, as shown in "b" of FIG. 11, the signal amount prediction circuit 251 in the nondestructive reading mode predicts a signal amount at the completion of exposure, and the proper gain calculation circuit 252 increases an analog gain to obtain a sufficiently large signal amount. This can increase the signal amount and improve the S/N ratio.

If an analog gain is increased, an increase in signal amount per unit time (in other words, the slope of the graph) becomes larger. Thus, the output level adjusting circuit 254 adjusts the signal level according to the ratio of the value of the increased analog gain and the initial value. This can keep the linearity.

Figure 12:
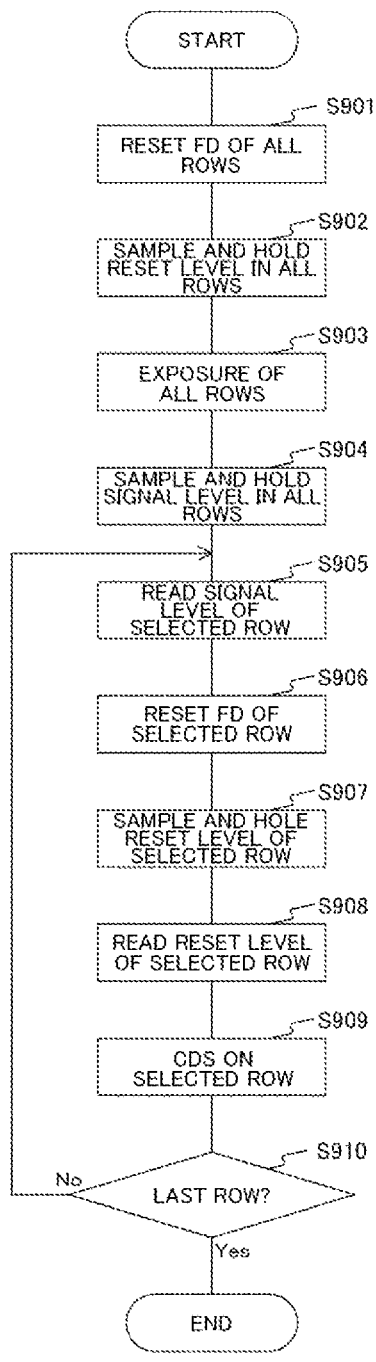
FIG. 12 is a flowchart showing an example of an operation of the solid-state imaging element in a normal mode according to the first embodiment of the present technique.

FIG. 12 is a flowchart showing an example of an operation of the solid-state imaging element 200 in the normal mode according to the first embodiment of the present technique. This operation is started, for example, when a predetermined application for generating a ranging image is performed.

The vertical scanning circuit 211 resets FD of all the rows (step S901). The sample hold circuits 340 and 360 then sample and hold the reset level in all the rows (step S902). After exposure in all the rows (step S903), the sample hold circuits 340 and 360 in all the rows sample and hold the signal level (step S904).

The solid-state imaging element 200 selects the rows in a predetermined order and reads the signal level of the selected row (step S905). The vertical scanning circuit 211 resets the FD of the selected row (step S906). The sample hold circuits 340 and 360 in all rows then sample and hold the reset level (step S907). The solid-state imaging element 200 reads the reset level of the selected row (step S908) and performs CDS processing on the selected row (step S909).

The solid-state imaging element 200 determines whether or not the selected row is the last row (step S910). If the selected row is not the last row (step S910: No), the solid-state imaging element 200 repeats step S905 and the subsequent steps. If the selected row is the last row (step S910: Yes), the solid-state imaging element 200 terminates the operation for imaging.

As described above, according to the first embodiment of the present technique, the sample hold circuits 340 and 360 hold the pixel signals S1 and S2 for each pixel, so that the PLS properties are improved and the dynamic range of a depth map is easily extended. Accordingly, the signal quality of the depth map can be improved.

Modification Example

In the foregoing first embodiment, the solid-state imaging element 200 reads the signal level and the reset level after the completion of exposure. In this configuration, the reading speed is hard to increase. The solid-state imaging element 200 according to a modification example of the first embodiment is different from the first embodiment in that the reset level is read before exposure.

Figure 13:
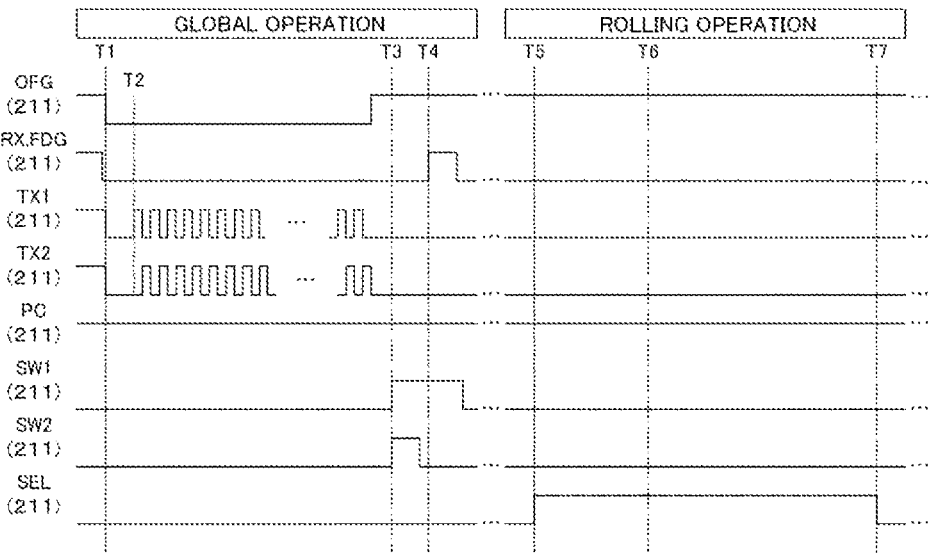
FIG. 13 is a timing chart showing an example of an operation of the solid-state imaging element according to a modification example of the first embodiment of the present technique.

FIG. 13 is a timing chart showing an example of the operation of the solid-state imaging element 200 according to the modification example of the first embodiment of the present technique. Before the start of exposure, the solid-state imaging element 200 sets the discharge signal OFG, the reset signal RX, the control signal FDG, the transfer signal TX1, and the transfer signal TX2 at a high level. Thus, the floating diffusion layers 319 and 320 are reset. Before the start of exposure, the solid-state imaging element 200 sequentially selects rows, reads (Vref-Vth) of the selected row as a reset level, converts the reset level into a digital signal, and holds the digital signal in the frame memory 256.

At timing T1, the vertical scanning circuit 211 shifts the discharge signal OFG, the reset signal RX, the control signal FDG, the transfer signal TX1, and the transfer signal TX2 from the high level to a low level in all rows.

In a period from timing T2 to the lapse of an exposure time, the vertical scanning circuit 211 periodically turns on or off the transfer signals TX1 and TX2 in all the rows.

Immediately before timing T3, the vertical scanning circuit 211 sets the discharge signal OFG at the high level. At timing T3, the vertical scanning circuit 211 sets the control signals SW1 and SW2 at the high level and then sequentially shifts the control signals SW2 and SW1 to the low level immediately after the setting to the high level. Thus, the signal level is kept in all the rows.

For a predetermined period from timing T4 immediately after timing T3, the vertical scanning circuit 211 supplies the reset signal RX and the control signal FDG at the high level. This resets the floating diffusion layers 319 and 320 in all the rows.

After a global operation for exposing all the pixels, a rolling operation is performed to sequentially read the rows. In the rolling operation, a reading period for a predetermined selected row is a period from timing T5 to T7.

In the period from timing T5 to T7, the vertical scanning circuit 211 sets the selection signal SEL and the control signal PC at the high level in the selected row. Moreover, at and after timing T6, the ADC 232 of each column converts (Vref-Vsig-Vth) of the vertical signal line in the selected row into a digital signal as a signal level. Thus, the signal level of the selected row is read.

The signal processing circuit 255 reads the reset level of the selected row from the frame memory 256 and performs CDS processing for determining a difference between the signal level and the reset level of the selected row.

As described above, the reset level is read in advance and is subjected to AD conversion, thereby eliminating the need for reading the reset level after the completion of exposure, and AD conversion.

Figure 14:
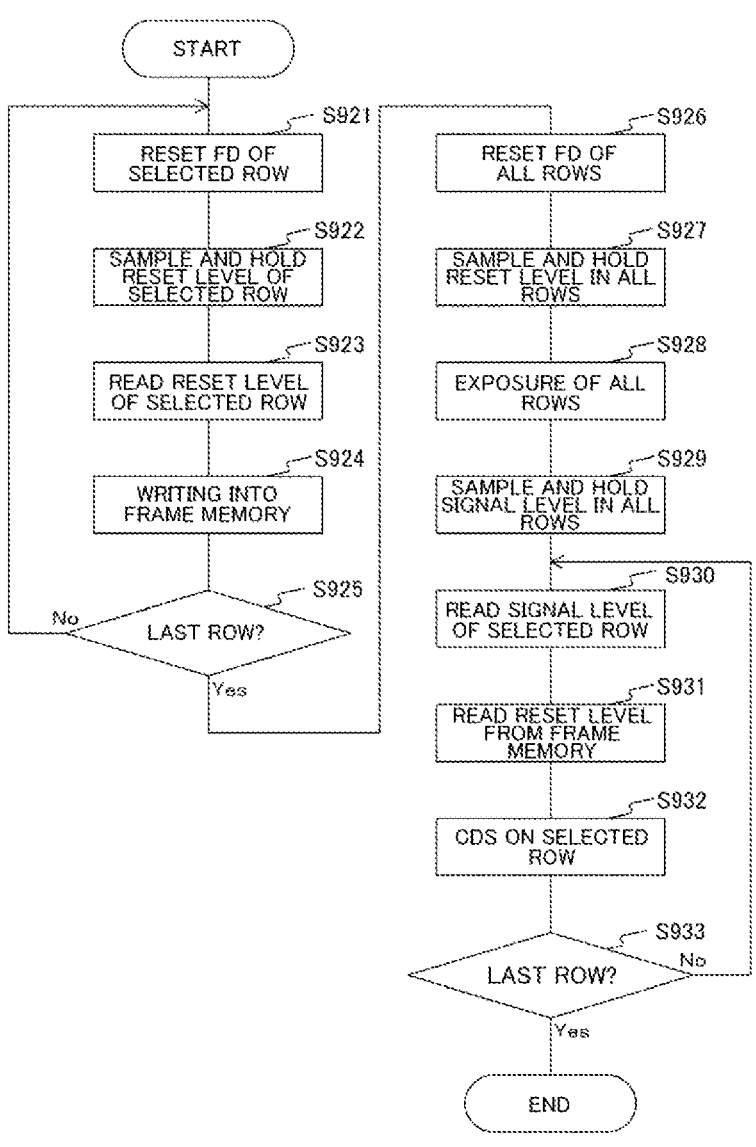
FIG. 14 is a flowchart showing an example of an operation of the solid-state imaging element according to the modification example of the first embodiment of the present technique.

FIG. 14 is a flowchart showing an example of the operation of the solid-state imaging element 200 according to the modification example of the first embodiment of the present technique. Before exposure, the vertical scanning circuit 211 selects the row and resets the floating diffusion layers 319 and 320 of the selected row (step S921). The sample hold circuits 340 and 360 of the selected row sample and hold the reset level (step S922). The solid-state imaging element 200 reads the reset level of the selected row and converts the reset level into a digital signal (step S923), and then the solid-state imaging element 200 writes the digital signal into the frame memory 256 (step S924).

The solid-state imaging element 200 determines whether or not the selected row is the last row (step S925). If the selected row is not the last row (step S925: No), the solid-state imaging element 200 repeats step S921 and the subsequent steps.

If the selected row is the last row (step S925: Yes), the vertical scanning circuit 211 resets the floating diffusion layers 319 and 320 of all the rows (step S926). The sample hold circuits 340 and 360 of all the rows sample and hold the reset level (step S927). After the exposure of all the rows (step S928), the sample hold circuits 340 and 360 of all the rows sample and hold the signal level (step S929).

The solid-state imaging element 200 selects the rows in a predetermined order and reads the signal level of the selected row (step S930). Moreover, the solid-state imaging element 200 reads the reset level of the selected row from the frame memory 256 (step S931) and performs CDS processing on the selected row (step S932).

The solid-state imaging element 200 determines whether or not the selected row is the last row (step S933). If the selected row is not the last row (step S933: No), the solid-state imaging element 200 repeats step S930 and the subsequent steps. If the selected row is the last row (step S933: Yes), the solid-state imaging element 200 terminates the operation for imaging.

As described above, the solid-state imaging element 200 according to the modification example of the first embodiment eliminates the need for resetting the floating diffusion layers 319 and 320 and reading the reset level after exposure. Thus, during imaging of a plurality of frames, exposure for the second frame can be started in the reading period of the first frame.

Figure 15:
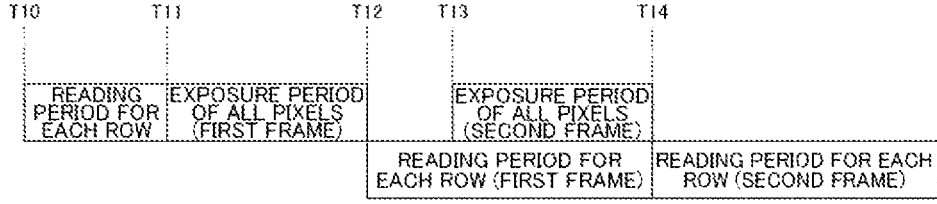
FIG. 15 is a timing chart showing an example of pipe-line processing according to the modification example of the first embodiment of the present technique.

FIG. 15 is a timing chart showing an example of pipe-line processing according to the modification example of the first embodiment of the present technique. In a period from timing T10 to T11, the solid-state imaging element 200 reads the reset level of the first frame in advance. In a period from timing T11 to T12, the solid-state imaging element 200 exposes all the pixels of the first frame.

Thereafter, in a period from timing T12 to T14, the solid-state imaging element 200 sequentially selects the rows and reads the signal level of the first frame. At timing T13 in the period, the solid-state imaging element 200 starts exposing all the pixels of the second frame and terminates the exposure at timing T14.

Thereafter, at timing T14 and later, the solid-state imaging element 200 sequentially selects the rows and reads the signal level and the reset level of the second frame. After the completion of reading of the second frame, exposure is started for the third frame. Thereafter, exposure and reading are sequentially performed as in the first embodiment.

As shown in FIG. 15, exposure and reading are subjected to pipe-line processing, achieving a higher reading speed than in sequential processing.

As described above, according to the modification example of the first embodiment of the present technique, the solid-state imaging element 200 reads the reset level before exposure, thereby eliminating the need for reading the reset level after exposure. Thus, exposure and reading can be subjected to pipe-line processing during imaging of the plurality of frames.

2. Second Embodiment

In the first embodiment, the sample hold circuits 340 and 360 having the circuit configuration illustrated in FIG. 5 are disposed. The sample hold circuits 340 and 360 are not limited to the circuit configuration. A solid-state imaging element 200 according to a second embodiment is different from the first embodiment in the circuit configuration of sample hold circuits 340 and 360.

Figure 16:
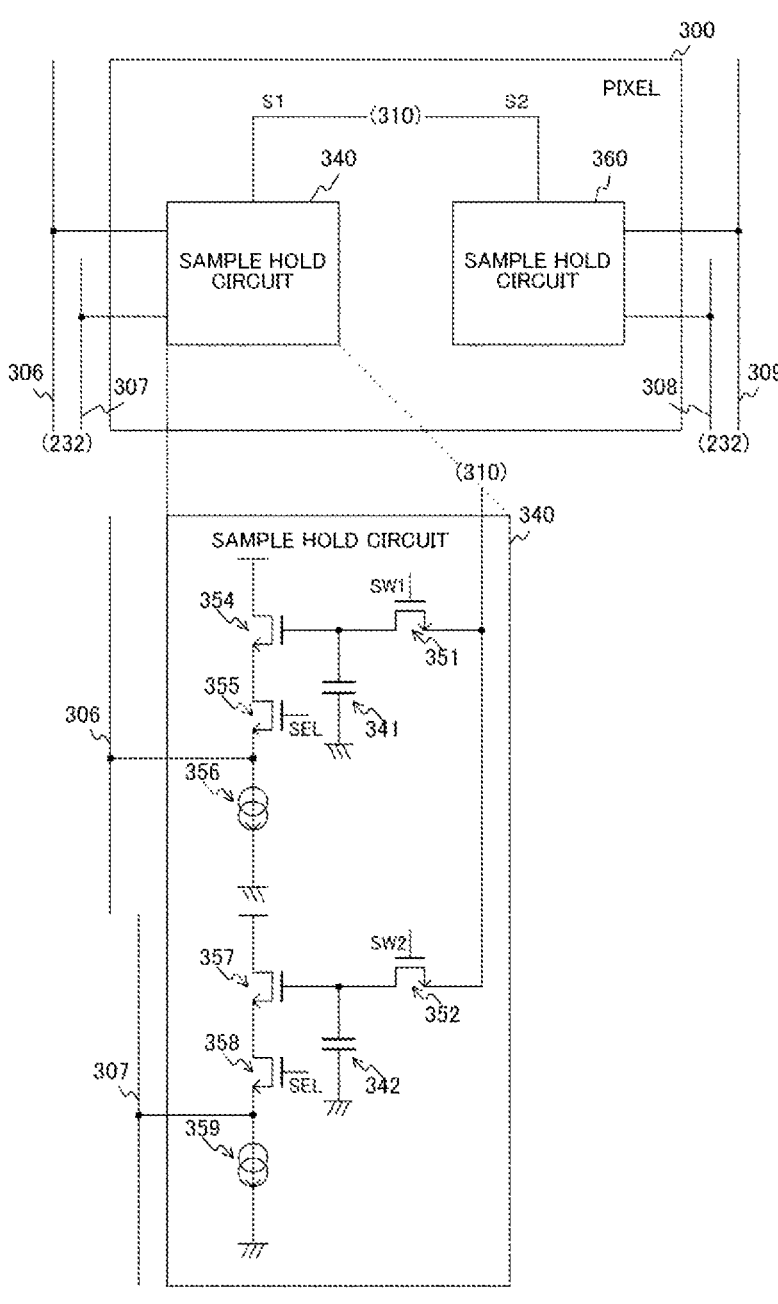
FIG. 16 is a circuit diagram showing a configuration example of a sample hold circuit on the left side according to a second embodiment of the present technique.

FIG. 16 is a circuit diagram showing a configuration example of the sample hold circuit 340 on the left side according to the second embodiment of the present technique. The sample hold circuit 340 of the second embodiment is different from the first embodiment in that a post-amplification transistor 357, a selection transistor 358, and a post-current source transistor 359 are further provided.

In the second embodiment, four vertical signal lines are disposed for each column, and four ADCs 232 (not shown) are disposed for each column.

In the sample hold circuit 340, one end of a capacitive element 341 is connected to the gate of a post-amplification transistor 354 and a sampling transistor 351 opens or closes a path between one end of the capacitive element 341 and a pixel signal generation unit 310. The capacitive element 341 holds a reset level.

One end of a capacitive element 342 is connected to the gate of a post-amplification transistor 357 and a sampling transistor 352 opens or closes a path between one end of the capacitive element 342 and the pixel signal generation unit 310. The capacitive element 342 holds a signal level.

The post-amplification transistor 357, the selection transistor 358, and the post-current source transistor 359 are inserted in series between a power supply voltage and a ground terminal. The drain of the post-amplification transistor 357 is connected to the power supply voltage and acts as a source follower circuit.

A selection transistor 355 supplies the reset level held in the capacitive element 341 to a vertical signal line 306, and the selection transistor 358 supplies the signal level held in the capacitive element 342 to a vertical signal line 307.

Figure 17:
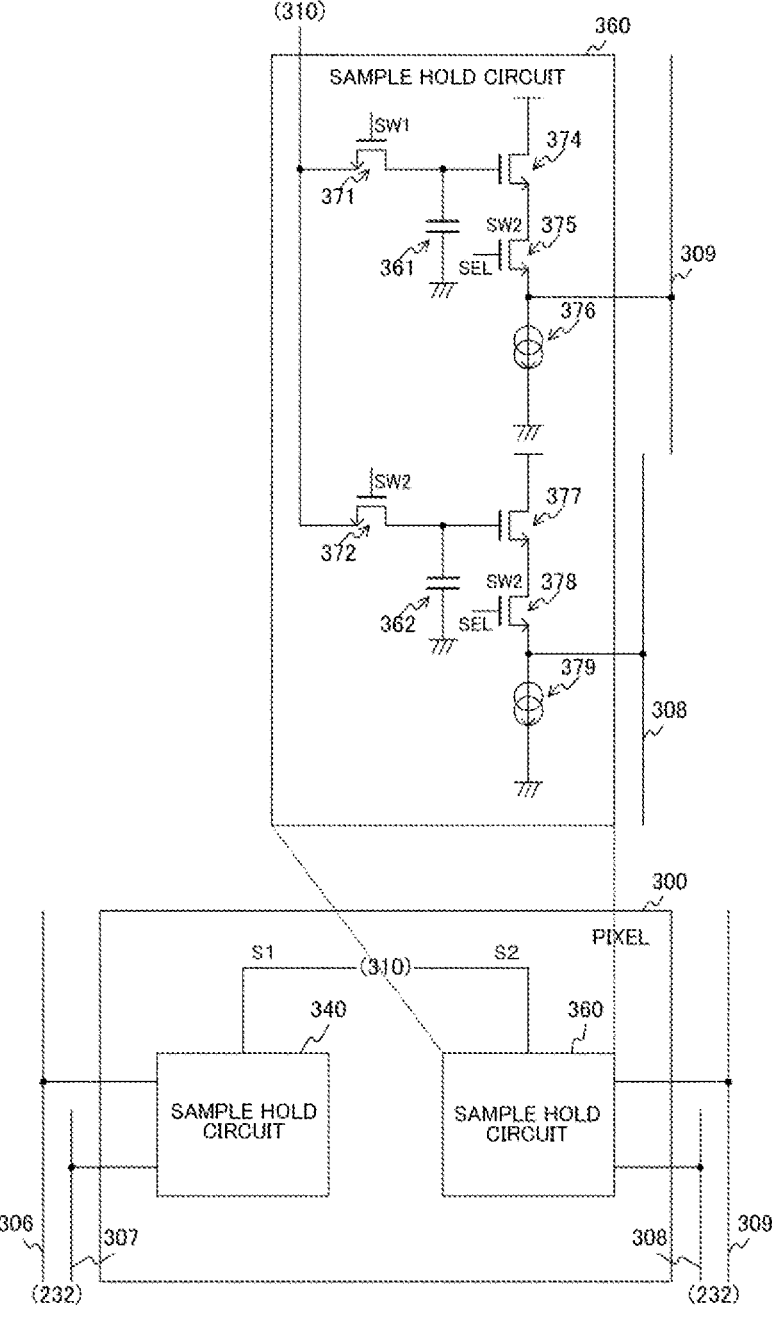
FIG. 17 is a circuit diagram showing a configuration example of a sample hold circuit on the right side according to the second embodiment of the present technique.

FIG. 17 is a circuit diagram showing a configuration example of the sample hold circuit 360 on the right side according to the second embodiment of the present technique. The sample hold circuit 360 of the second embodiment is different from the first embodiment in that a post-amplification transistor 377, a selection transistor 378, and a post-current source transistor 379 are further provided.

In the sample hold circuit 360, one end of a capacitive element 361 is connected to the gate of a post-amplification transistor 374 and a sampling transistor 371 opens or closes a path between one end of the capacitive element 361 and the pixel signal generation unit 310. The capacitive element 361 holds the reset level.

One end of a capacitive element 362 is connected to the gate of a post-amplification transistor 377 and a sampling transistor 372 opens or closes a path between one end of the capacitive element 362 and the pixel signal generation unit 310. The capacitive element 362 holds the signal level.

The post-amplification transistor 377, the selection transistor 378, and the post-current source transistor 379 are inserted in series between the power supply voltage and the ground terminal.

A selection transistor 375 supplies the reset level held in the capacitive element 361 to a vertical signal line 309, and the selection transistor 378 supplies the signal level held in the capacitive element 362 to a vertical signal line 308.

A method for controlling the circuit shown in FIGS. 16 and 17 is specifically described in, for example, JP 2002-344809 A.

The reset level and the signal level are held in the different capacitive elements and four ADCs are disposed for each column, so that the reset level and the signal level can be read at the same time. This can achieve a higher reading speed than in the first embodiment.

As described above, according to the second embodiment of the present technique, the signal level and the reset level are held in the different capacitive elements, thereby improving the reading speed.

First Modification Example

In the second embodiment, the sample hold circuits 340 and 360 having the circuit configuration illustrated in FIGS. 16 and 17 are disposed. The sample hold circuits 340 and 360 are not limited to the circuit configuration. The solid-state imaging element 200 according to a first modification example of the second embodiment is different from the second embodiment in the circuit configuration of the sample hold circuits 340 and 360.

Figure 18:
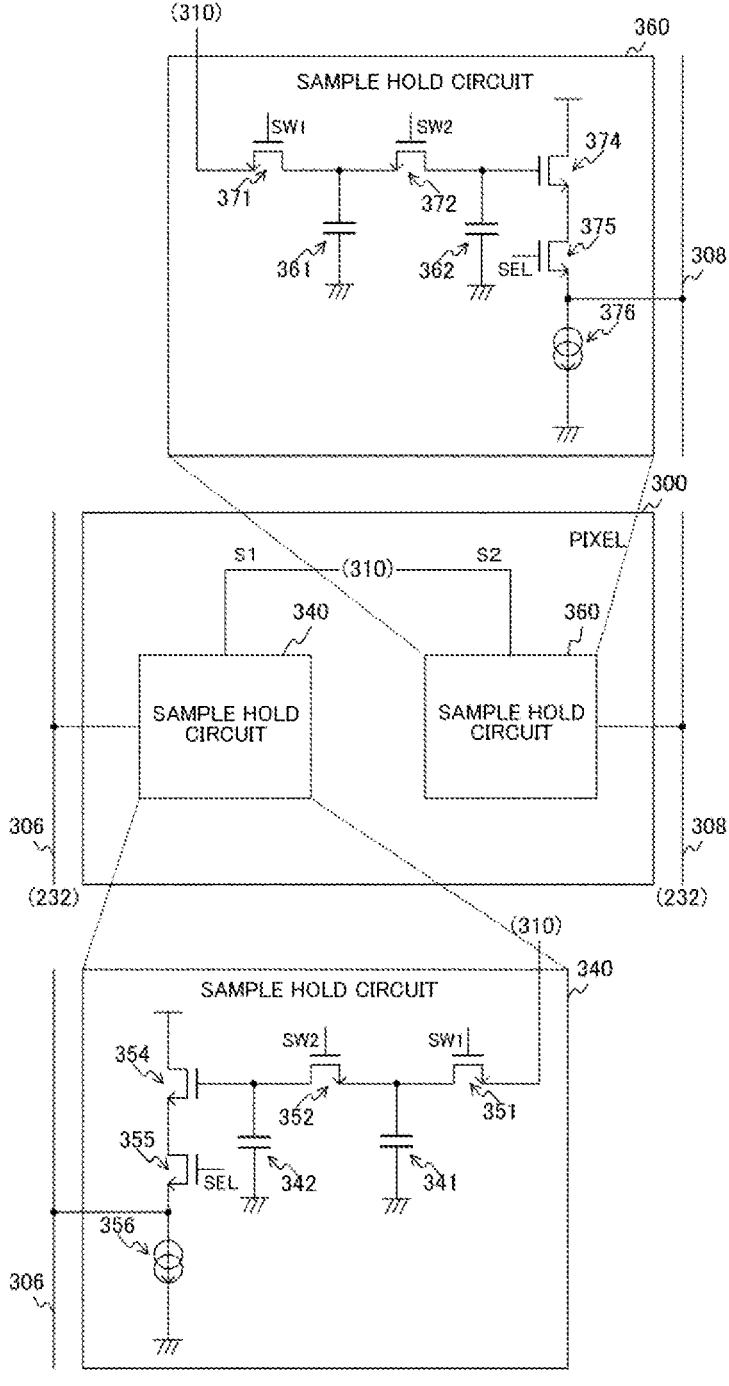
FIG. 18 is a circuit diagram showing a configuration example of the sample hold circuits according to a first modification example of the second embodiment of the present technique.

FIG. 18 is a circuit diagram illustrating a configuration example of the sample hold circuits 340 and 360 according to the first modification example of the second embodiment of the present technique. In the sample hold circuit 340 according to the first modification example of the second embodiment, the post-amplification transistor 357, the selection transistor 358, and the post-current source transistor 359 are not disposed. In the sample hold circuit 360 according to the first modification example of the second embodiment, the post-amplification transistor 377, the selection transistor 378, and the post-current source transistor 379 are not disposed.

In the sample hold circuit 340, the sampling transistor 351 opens or closes a path between one end of the capacitive element 341 and the pixel signal generation unit 310. One end of the capacitive element 342 is connected to the gate of the post-amplification transistor 354 and the sampling transistor 352 opens or closes a path between one end of the capacitive element 342 and one end of the capacitive element 341.

In the sample hold circuit 360, the sampling transistor 371 opens or closes a path between one end of the capacitive element 361 and the pixel signal generation unit 310. One end of the capacitive element 362 is connected to the gate of the post-amplification transistor 374 and the sampling transistor 372 opens or closes a path between one end of the capacitive element 362 and one end of the capacitive element 361.

A method for controlling the circuit shown in FIG. 18 is specifically described in, for example, "Chen Xu, et al., A Stacked Global-Shutter CMOS Imager with SC-Type Hybrid-GS Pixel and Self-Knee Point Calibration Single-Frame HDR and On-Chip Binarization Algorithm for Smart Vision Applications, ISSCC2019".

According to the circuit shown in FIG. 18, pixel signals are held in the capacitive elements 341 and 342, thereby eliminating the need for supplying a reference voltage Vref unlike in the first embodiment.

As described above, according to the first modification of the second embodiment of the present technique, the pixel signals are held in the capacitive elements 341 and 342 in the circuit shown in FIG. 18, thereby eliminating the need for supplying the reference voltage Vref.

Second Modification Example

In the second embodiment, the sample hold circuits 340 and 360 having the circuit configuration illustrated in FIGS. 16 and 17 are disposed. The sample hold circuits 340 and 360 are not limited to the circuit configuration. The solid-state imaging element 200 according to a second modification example of the second embodiment is different from the second embodiment in the circuit configuration of the sample hold circuits 340 and 360.

Figure 19:
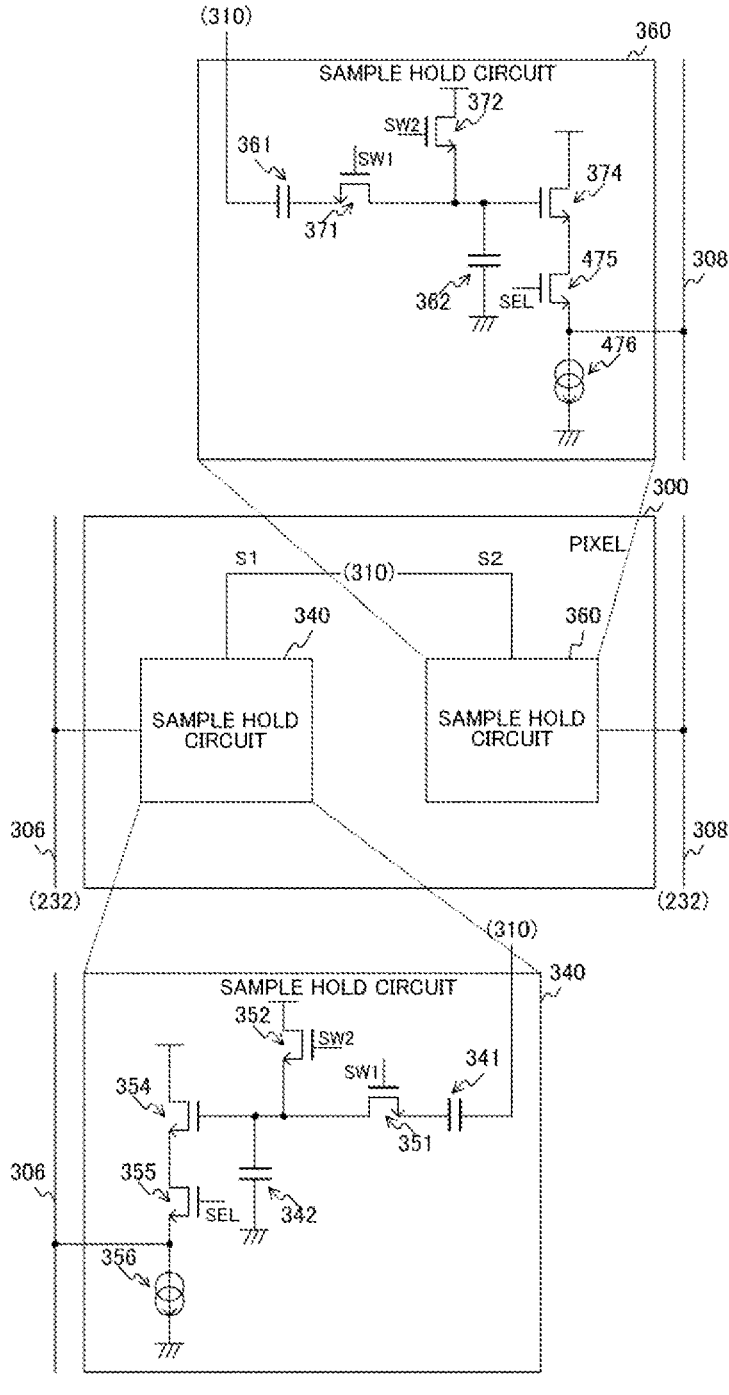
FIG. 19 is a circuit diagram showing a configuration example of the sample hold circuits according to a second modification example of the second embodiment of the present technique.

FIG. 19 is a circuit diagram illustrating a configuration example of the sample hold circuits 340 and 360 according to the second modification example of the second embodiment of the present technique. In the sample hold circuit 340 according to the second modification example of the second embodiment, the post-amplification transistor 357, the selection transistor 358, and the post-current source transistor 359 are not disposed. In the sample hold circuit 360 according to the second modification example of the second embodiment, the post-amplification transistor 377, the selection transistor 378, and the post-current source transistor 379 are not disposed.

In the sample hold circuit 340, one end of the capacitive element 341 is connected to the pixel signal generation unit 310. The sampling transistor 351 opens or closes a path between the other end of the capacitive element 341 and one end of the capacitive element 342. One end of the capacitive element 342 is connected to the gate of the post-amplification transistor 354. The sampling transistor 352 opens or closes a path between one end of the capacitive element 342 and the power supply voltage.

In the sample hold circuit 360, one end of the capacitive element 361 is connected to the pixel signal generation unit 310. The sampling transistor 371 opens or closes a path between the other end of the capacitive element 361 and one end of the capacitive element 362. One end of the capacitive element 362 is connected to the gate of the post-amplification transistor 374. The sampling transistor 372 opens or closes a path between one end of the capacitive element 362 and the power supply voltage.

A method for controlling the circuit shown in FIG. 19 is specifically described in, for example, "Toru Kondo et al., A 3D stacked CMOS image sensor with 16Mpixel global-shutter mode using 4 million interconnections, 2015 Symposium on VLSI Circuits (VLSI Circuits)" and JP 2012-248952 A.

According to the circuit shown in FIG. 19, the pixel signals are held in the capacitive elements 341 and 342, thereby eliminating the need for supplying the reference voltage Vref unlike in the first embodiment.

As described above, according to the second modification example of the second embodiment of the present technique, the pixel signals are held in the capacitive elements 341 and 342 in the circuit shown in FIG. 19, thereby eliminating the need for supplying the reference voltage Vref.

Third Modification Example

In the second embodiment, the sample hold circuits 340 and 360 having the circuit configuration illustrated in FIGS. 16 and 17 are disposed. The sample hold circuits 340 and 360 are not limited to the circuit configuration. The solid-state imaging element 200 according to a third modification example of the second embodiment is different from the second embodiment in the circuit configuration of the sample hold circuits 340 and 360.

Figure 20:
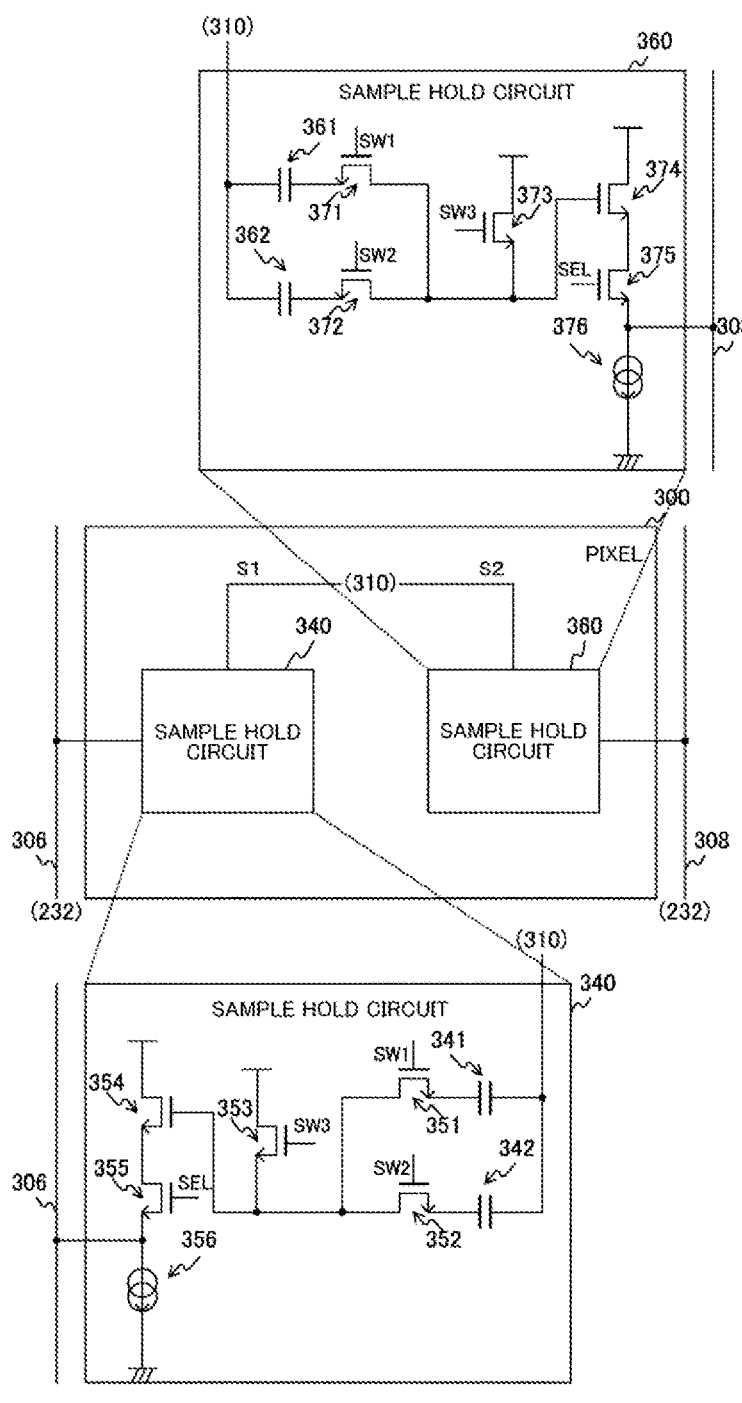
FIG. 20 is a circuit diagram showing a configuration example of the sample hold circuits according to a third modification example of the second embodiment of the present technique.

FIG. 20 is a circuit diagram illustrating a configuration example of the sample hold circuits 340 and 360 according to the third modification example of the second embodiment of the present technique. In the sample hold circuit 340 according to the third modification example of the second embodiment, the post-amplification transistor 357, the selection transistor 358, and the post-current source transistor 359 are not disposed. In the sample hold circuit 360 according to the third modification example of the second embodiment, the post-amplification transistor 377, the selection transistor 378, and the post-current source transistor 379 are not disposed. The sample hold circuits 340 and 360 according to the third modification example of the second embodiment further include sampling transistors 353 and 373. As these transistors, for example, nMOS transistors are used.

In the sample hold circuit 340, one ends of the capacitive elements 341 and 342 are connected in common to the pixel signal generation unit 310. The sampling transistor 351 opens or closes a path between the other end of the capacitive element 341 and a downstream node connected to the gate of the post-amplification transistor 354. The sampling transistor 352 opens or closes a path between the other end of the capacitive element 342 and the downstream node. The sampling transistor 353 opens or closes a path between the downstream node and a power supply voltage in accordance with a control signal SW3 from the vertical scanning circuit 211.

In the sample hold circuit 360, one ends of the capacitive elements 361 and 362 are connected in common to the pixel signal generation unit 310. The sampling transistor 371 opens or closes a path between the other end of the capacitive element 361 and a downstream node connected to the gate of the post-amplification transistor 374. The sampling transistor 372 opens or closes a path between the other end of the capacitive element 362 and the downstream node. The sampling transistor 373 opens or closes a path between the downstream node and the power supply voltage in accordance with the control signal SW3 from the vertical scanning circuit 211.

The sampling transistors 353 and 373 are examples of a third sampling transistor described in the claims.

Immediately before the completion of exposure, the vertical scanning circuit 211 sets the control signal SW3 at a high level over a predetermined period. In the predetermined period, the vertical scanning circuit 211 sets only the control signal SW1 at the high level over a pulse period, temporarily sets the control signals SW1 and SW2 at a low level, and sets only the control signal SW2 at the high level over the pulse period while supplying the transfer signal TX1.

Moreover, in a period during which the selection signal SEL of the selected row is set at the high level, the vertical scanning circuit 211 sets only the control signal SW1 at the high level over a predetermined period, sets only the control signal SW3 at the high level in the predetermined period, and then sets only the control signal SW2 at the high level over the predetermined period.

According to the control, when the downstream node is reset by the control signal SW3, the capacitive elements 341 and 342 are separated from the downstream node, thereby suppressing kTC noise at the time of the reset.

As described above, according to the third modification example of the second embodiment of the present technique, when the downstream node is reset, the capacitive elements 341 and 342 are separated from the downstream node, thereby reducing the kTC noise.

3. Third Embodiment

In the first embodiment, the circuit in the solid-state imaging element 200 is disposed in a single semiconductor chip. This configuration makes it difficult to increase the area of the photoelectric conversion element and the transistor. A solid-state imaging element 200 according to a third embodiment is different from the first embodiment in that the solid-state imaging element 200 has a laminated structure.

Figure 21:
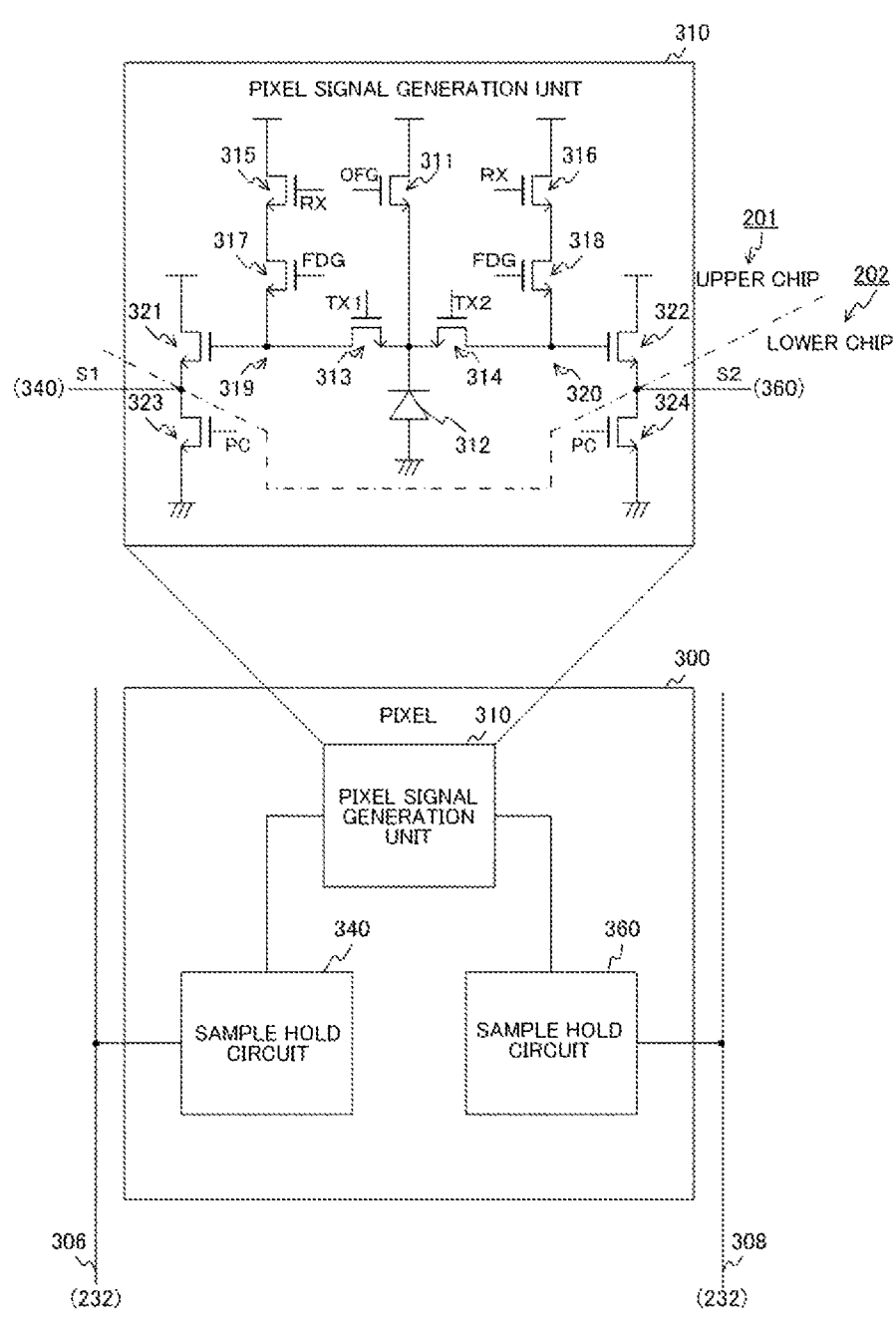
FIG. 21 is a circuit diagram showing a configuration example of a pixel according to a third embodiment of the present technique.

FIG. 21 is a circuit diagram illustrating a configuration example of a pixel 300 according to the third embodiment of the present technique. The solid-state imaging element 200 according to the third embodiment has an upper chip 201 and a lower chip 202 that are stacked on top of each other. These chips are connected by Cu—Cu bonding, vias, or bumps. The upper chip 201 and the lower chip 202 are examples of first and second chips described in the claims.

From among elements in a pixel signal generation unit 310, elements other than pre-current source transistors 323 and 324 are disposed in the upper chip 201. The pre-current source transistors 323 and 324, sample hold circuits 340 and 360, and other circuit (including an ADC 232) in the solid-state imaging element 200 are disposed in the lower chip 202.

The laminated structure, which is illustrated at the same time, allows the photoelectric conversion elements and the transistors of the chips to have a larger area than those in the first embodiment.

Figure 22:
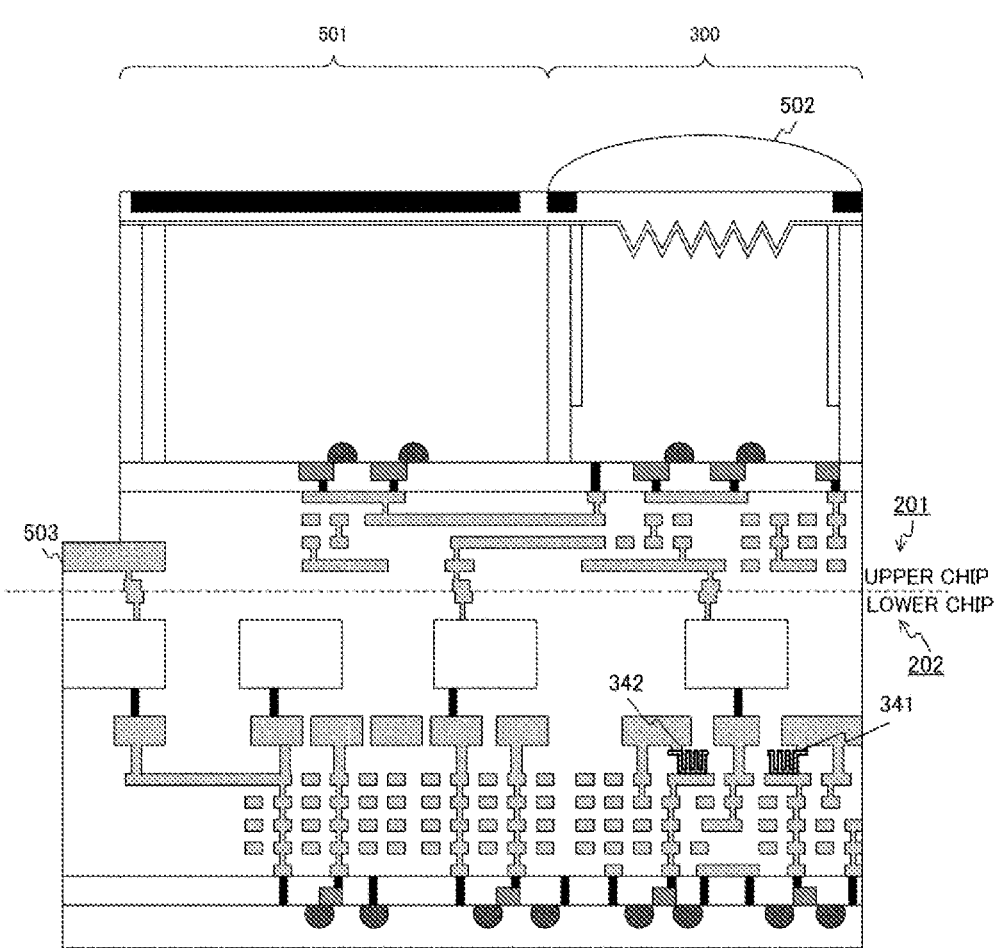
FIG. 22 shows an example of a cross-sectional view of a solid-state imaging element according to the third embodiment of the present technique.

FIG. 22 shows an example of a cross-sectional view of the solid-state imaging element 200 according to the third embodiment of the present technique. Since the sample hold circuits 340 and 360 are disposed in the lower chip 202, capacitive elements 341 and 342 in the circuit are disposed in the lower chip 202.

In FIG. 22, a microlens 502 is disposed on the pixel 300. Furthermore, a circuit 501 and a pad 503 for external connection are disposed around the pixel 300. The circuit 501 includes a vertical scanning circuit 211 and the ADC 232.

Moreover, the modification example of the first embodiment can be applied to the third embodiment. In addition, the second embodiment or the first, second, and third modification examples of the second embodiment can be applied to the third embodiment.

As described above, according to the third embodiment of the present technique, the circuits are disposed in a distributed manner in the upper chip 201 and the lower chip 202, thereby increasing the areas of the photoelectric conversion elements and the transistors.

Modification Example

In the foregoing third embodiment, the capacitive elements 341 and 342 are disposed in the lower chip 202. This configuration makes it difficult to reduce the circuit size of the lower chip 202. The solid-state imaging element 200 according to a modification example of the third embodiment is different from the third embodiment in that the capacitive element 341 and the like are disposed in the upper chip 201.

Figure 23:
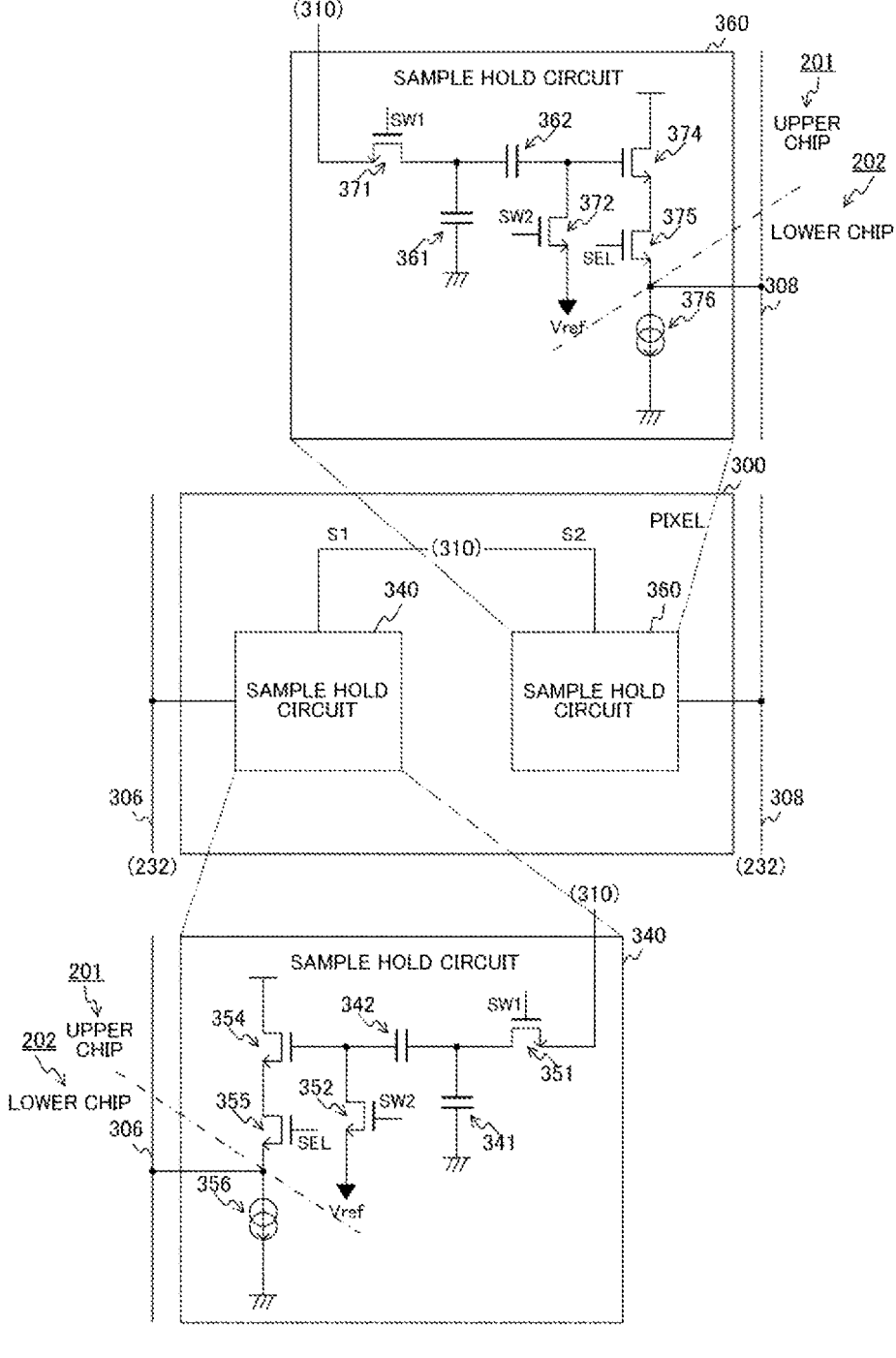
FIG. 23 is a circuit diagram showing a configuration example of the pixel according to a modification example of the third embodiment of the present technique.

FIG. 23 is a circuit diagram showing a configuration example of the pixel 300 according to the modification example of the third embodiment of the present technique. In the modification example of the third embodiment, the pixel signal generation unit 310 and elements other than the post-current source transistors 356 and 376 in the sample hold circuits 340 and 360 are disposed in the upper chip 201. The post-current source transistors 356 and 376 and other circuits are disposed in the lower chip 202.

Moreover, the modification example of the first embodiment can be applied to the modification example of the third embodiment.

Figure 24:
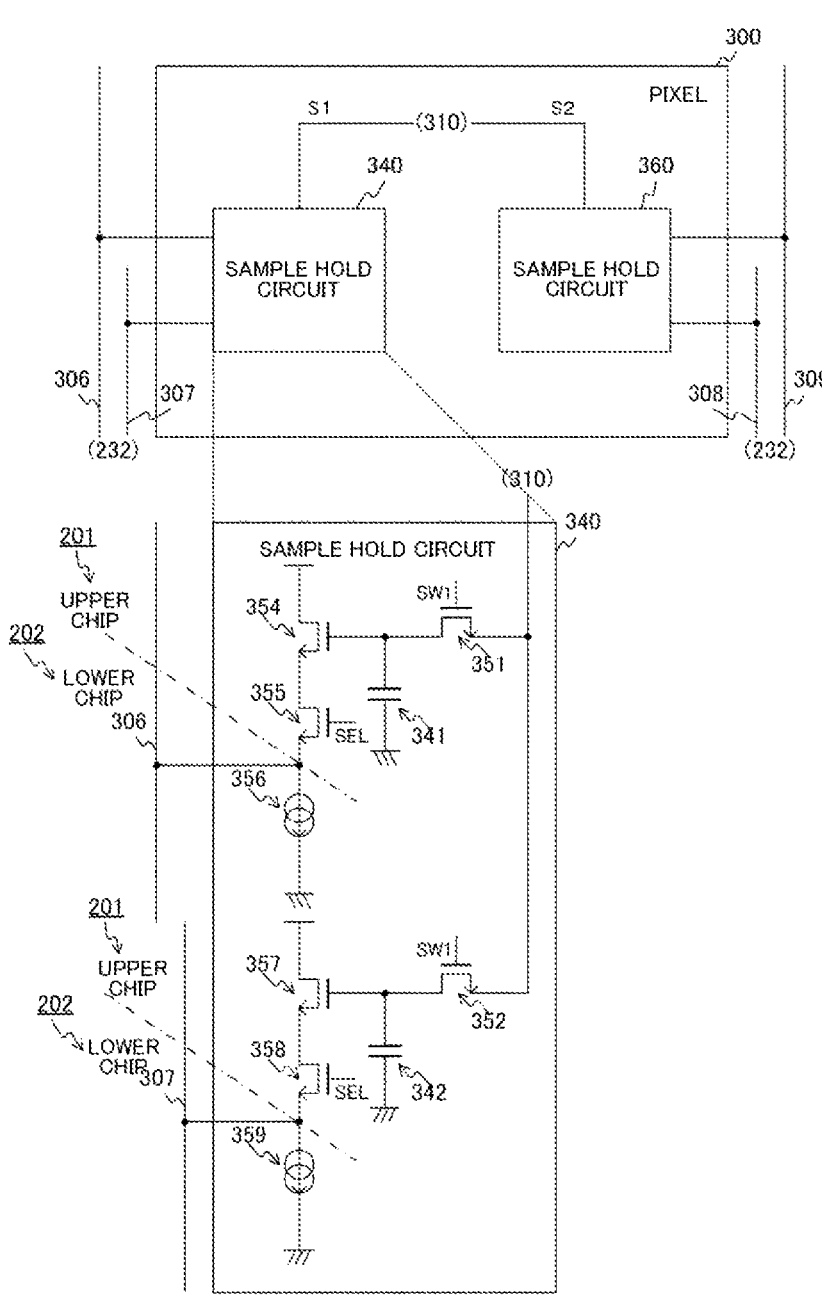
FIG. 24 is a circuit diagram showing a configuration example of a sample hold circuit on the left side, which corresponds to the second embodiment, according to a modification example of the third embodiment of the present technique.
Figure 25:
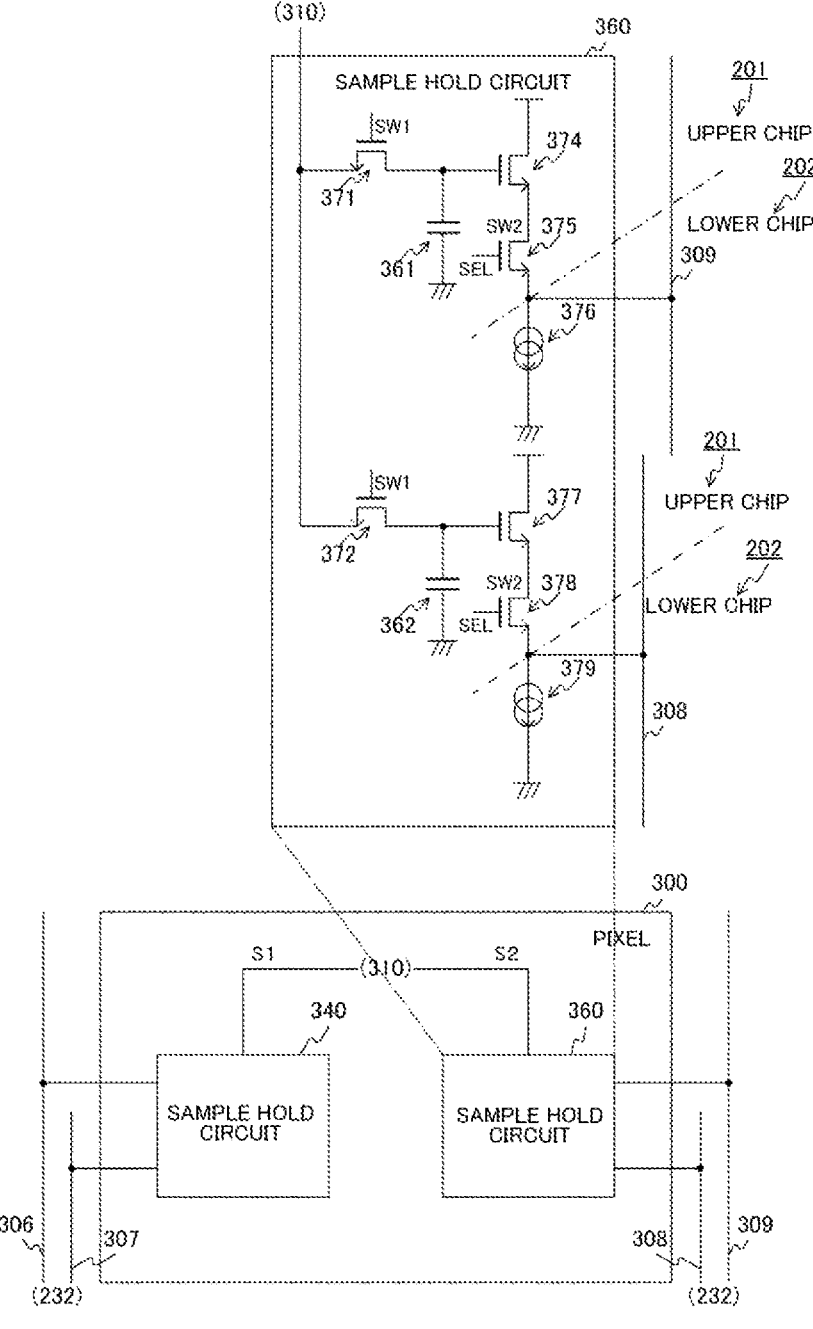
FIG. 25 is a circuit diagram showing a configuration example of a sample hold circuit on the right side, which corresponds to the second embodiment, according to the modification example of the third embodiment of the present technique.

As illustrated in FIGS. 24 and 25, the second embodiment can be also applied to the modification example of the third embodiment.

Figure 26:
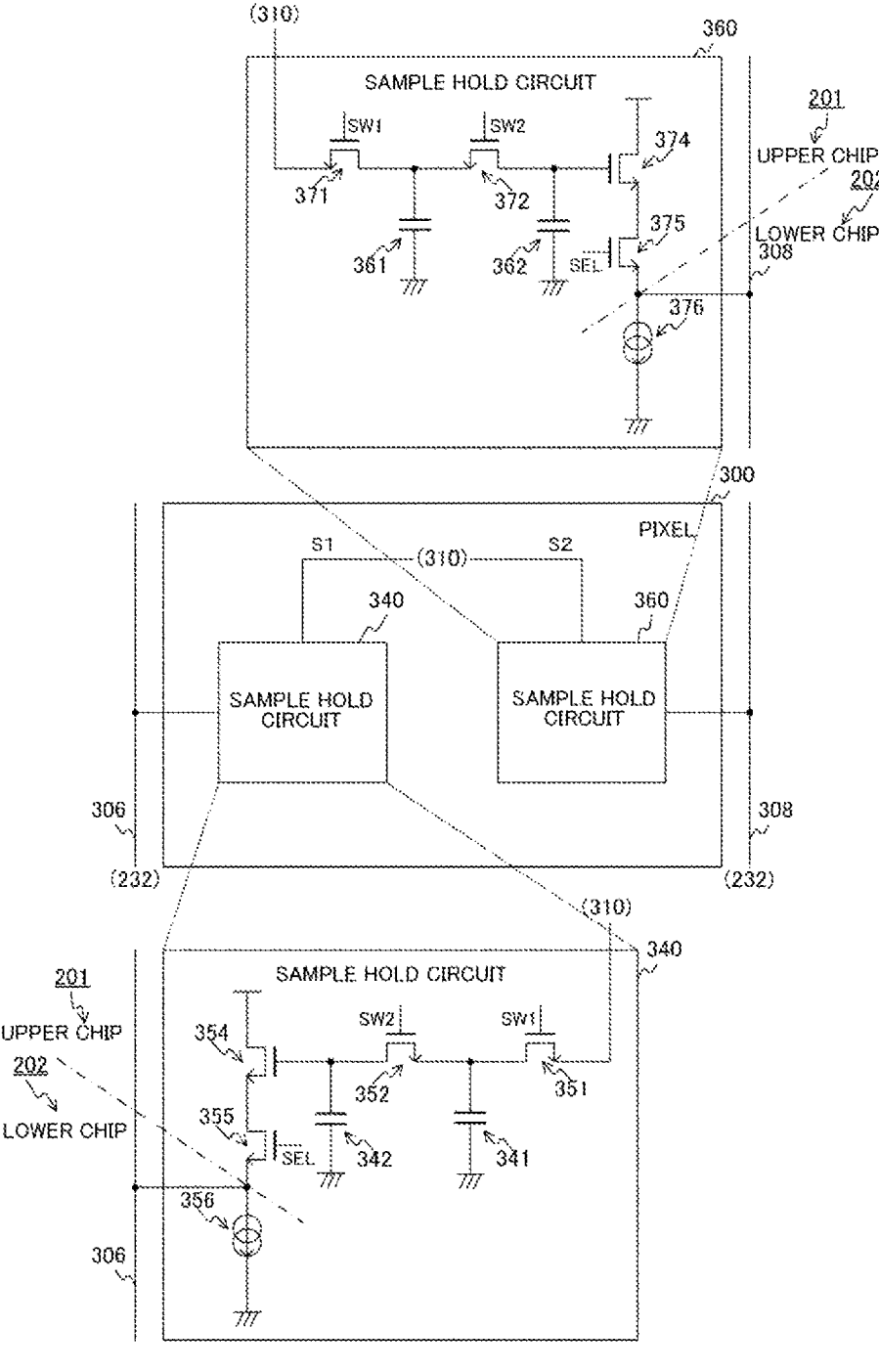
FIG. 26 is a circuit diagram showing a configuration example of sample hold circuits, which correspond to the first modification example of the second embodiment, according to the modification example of the third embodiment of the present technique.

As illustrated in FIG. 26, the first modification example of the second embodiment can be also applied to the modification example of the third embodiment.

Figure 27:
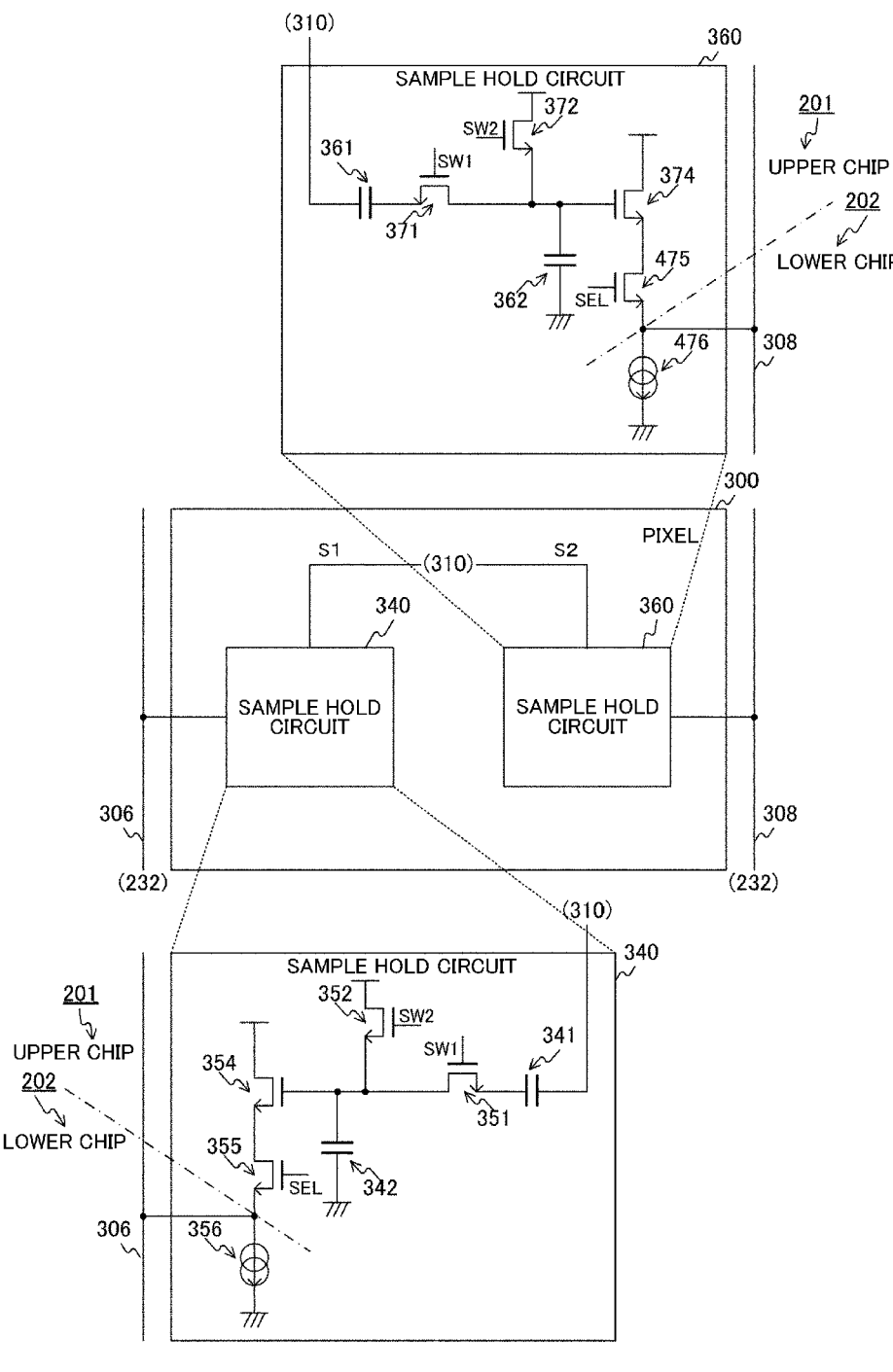
FIG. 27 is a circuit diagram showing a configuration example of sample hold circuits, which correspond to the second modification example of the second embodiment, according to the modification example of the third embodiment of the present technique.

As illustrated in FIG. 27, the second modification example of the second embodiment can be also applied to the modification example of the third embodiment.

Figure 28:
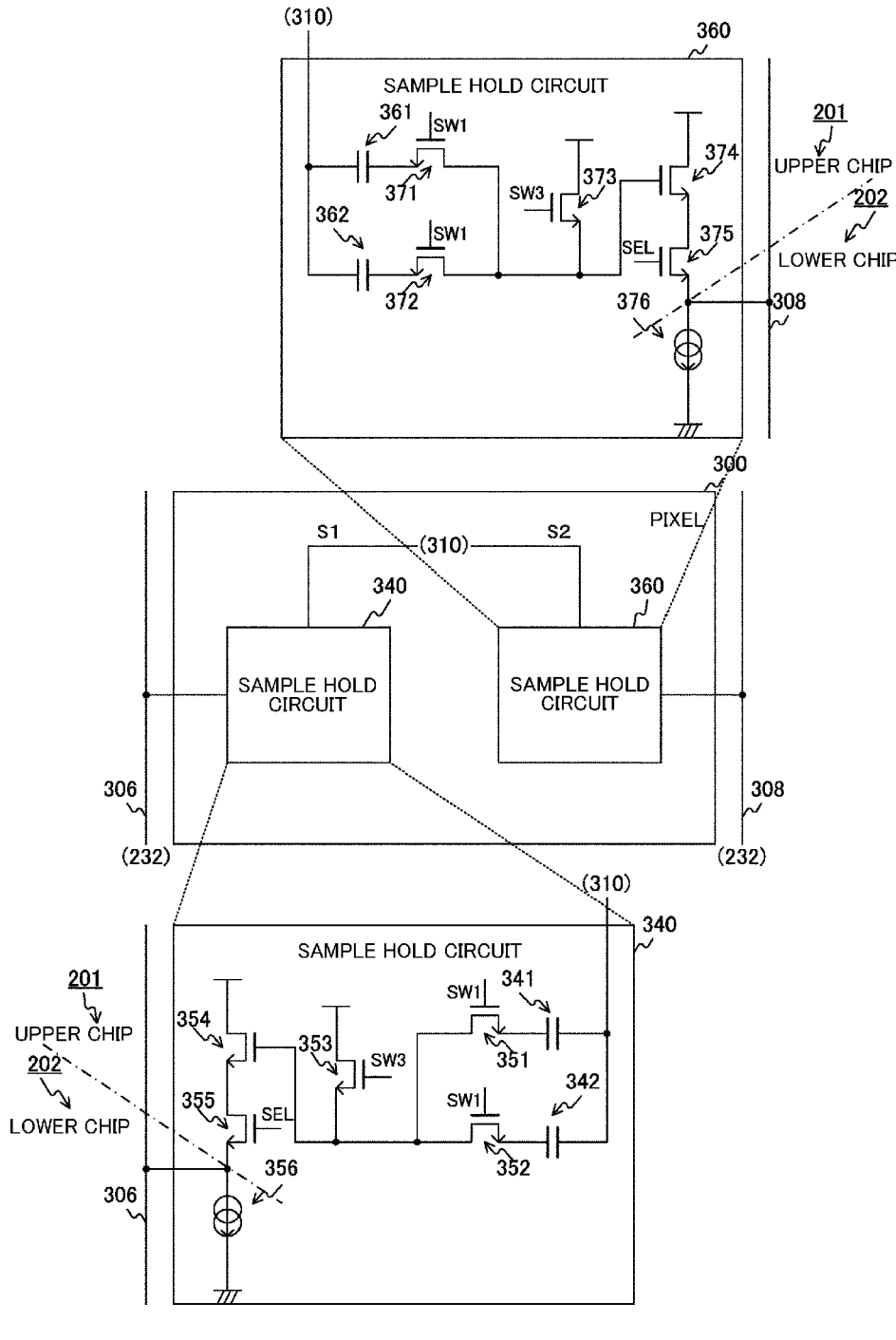
FIG. 28 is a circuit diagram showing a configuration example of sample hold circuits, which correspond to the third modification example of the second embodiment, according to the modification example of the third embodiment of the present technique.

As illustrated in FIG. 28, the third modification example of the second embodiment can be also applied to the modification example of the third embodiment.

Figure 29:
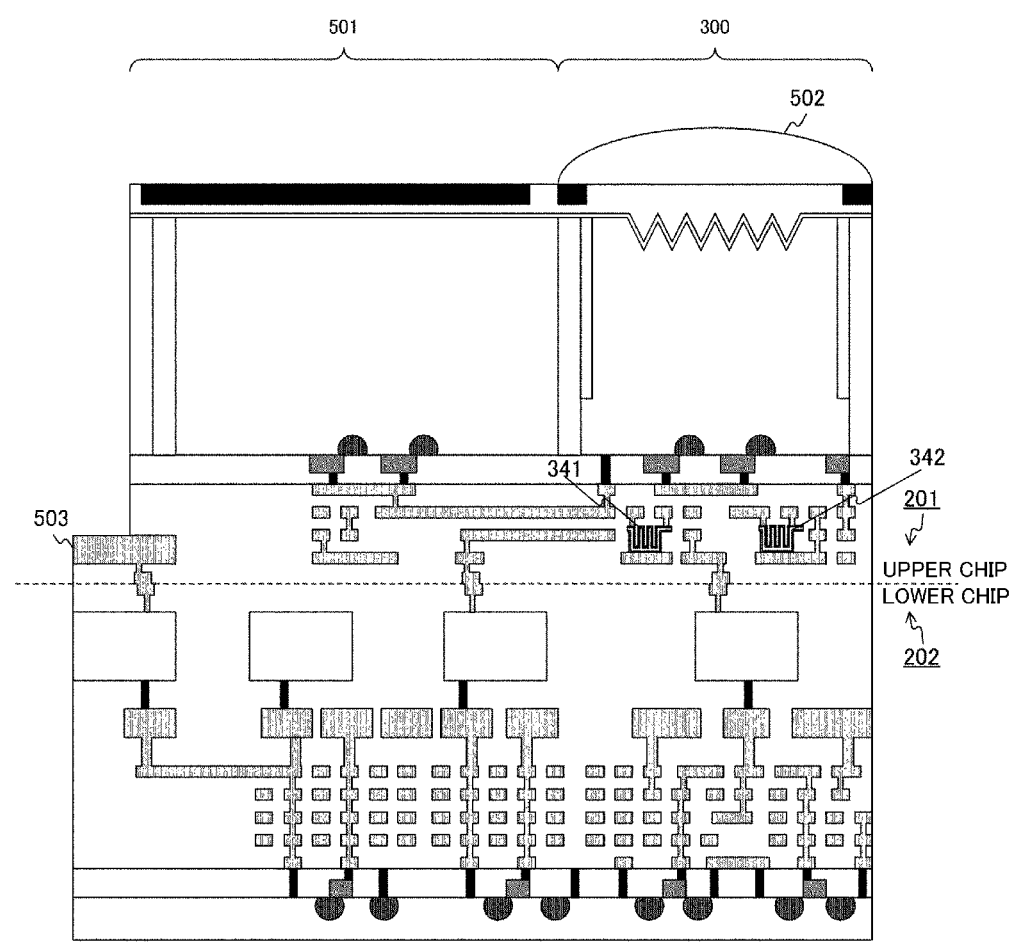
FIG. 29 shows an example of a cross-sectional view of a solid-state imaging element according to the modification example of the third embodiment of the present technique.

FIG. 29 shows an example of a cross-sectional view of the solid-state imaging element 200 according to the third embodiment of the present technique. The capacitive elements 341 and 342 are disposed in the upper chip 201. Thus, the circuit size of the lower chip 202 can be reduced.

As described above, according to the modification example of the third embodiment of the present technique, the capacitive element 341 and the like are disposed in the upper chip 201, thereby reducing the circuit size of the lower chip 202.

4. Fourth Embodiment

In the foregoing first embodiment, the sample hold circuits 340 and 360 are provided for each pixel and the two vertical signal lines are disposed for each column. This configuration makes it difficult to further reduce wiring or a circuit size. A solid-state imaging element 200 according to a fourth embodiment is different from the first embodiment in that sample hold circuits 340 and 360 share some circuits.

Figure 30:
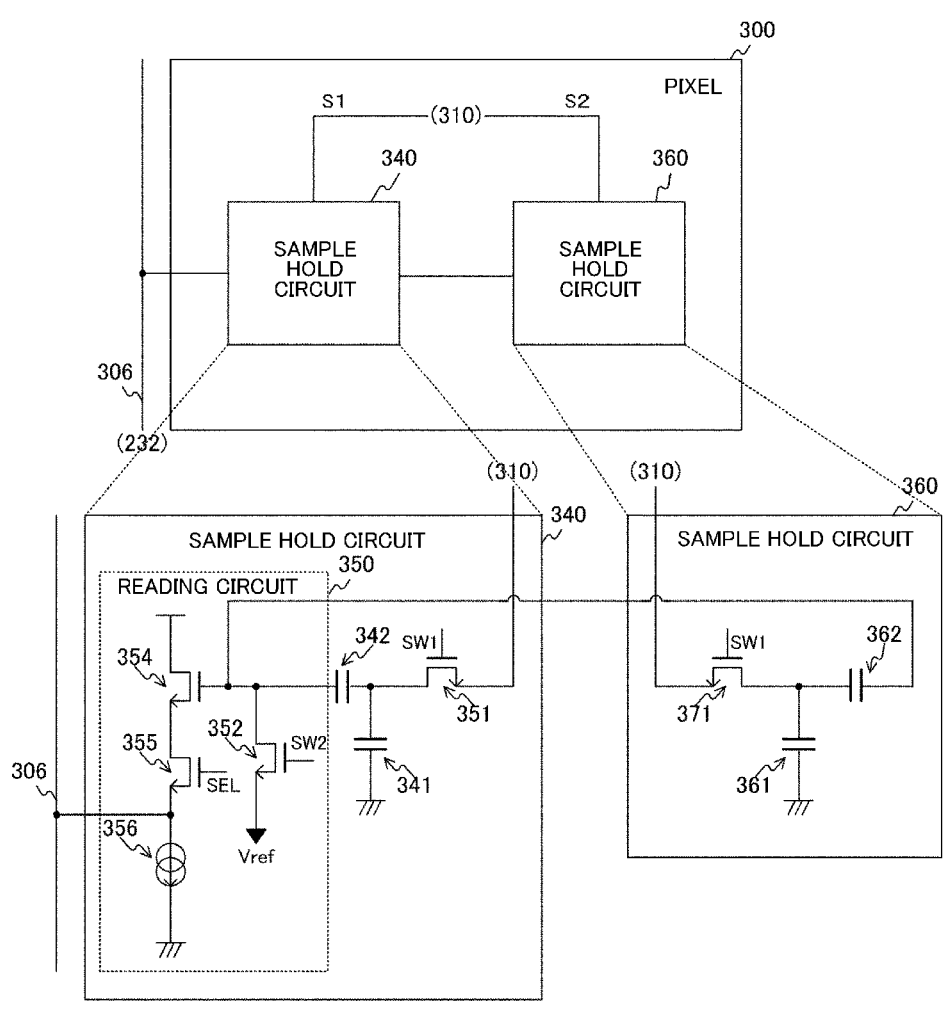
FIG. 30 is a circuit diagram showing a configuration example of sample hold circuits according to a fourth embodiment of the present technique.

FIG. 30 is a circuit diagram showing a configuration example of the sample hold circuits 340 and 360 according to the fourth embodiment of the present technique. The sample hold circuit 360 of the fourth embodiment is different from the first embodiment in that a post-amplification transistor 374, a selection transistor 375, and a post-current source transistor 376 are not disposed.

In the fourth embodiment, a vertical signal line is disposed for each column, and an ADC 232 is disposed for each column.

In the sample hold circuit 340, a circuit including a post-amplification transistor 354, a selection transistor 355, and a post-current source transistor 356 will be referred to as a reading circuit 350. The other end of a capacitive element 362 is connected to the gate of the post-amplification transistor 354. With this connection, the reading circuit 350 is shared by the sample hold circuits 340 and 360. By sharing the reading circuit 350, the number of vertical signal lines and the circuit size of the sample hold circuit 360 can be reduced.

During reading, a vertical scanning circuit 211 drives one of the sample hold circuits 340 and 360 to output a signal level and a reset level and then drives the other to output the signal level and the reset level.

The modification example of the first embodiment, the third embodiment, and the modification example of the third embodiment can be applied to the fourth embodiment.

As described above, according to the fourth embodiment of the present technique, the sample hold circuits 340 and 360 share the reading circuit 350, achieving a smaller number of wires and a smaller circuit size than in the case where the reading circuit 350 is not shared.

5. Example of Application to Moving Object

The technique according to the present disclosure (the present technique) can be applied to various products. For example, the technique according to the present disclosure may be implemented as a device equipped in any type of moving object such as an automobile, an electric vehicle, a hybrid electric vehicle, a motorcycle, a bicycle, a personal mobility device, an airplane, a drone, a ship, or a robot.

Figure 31:
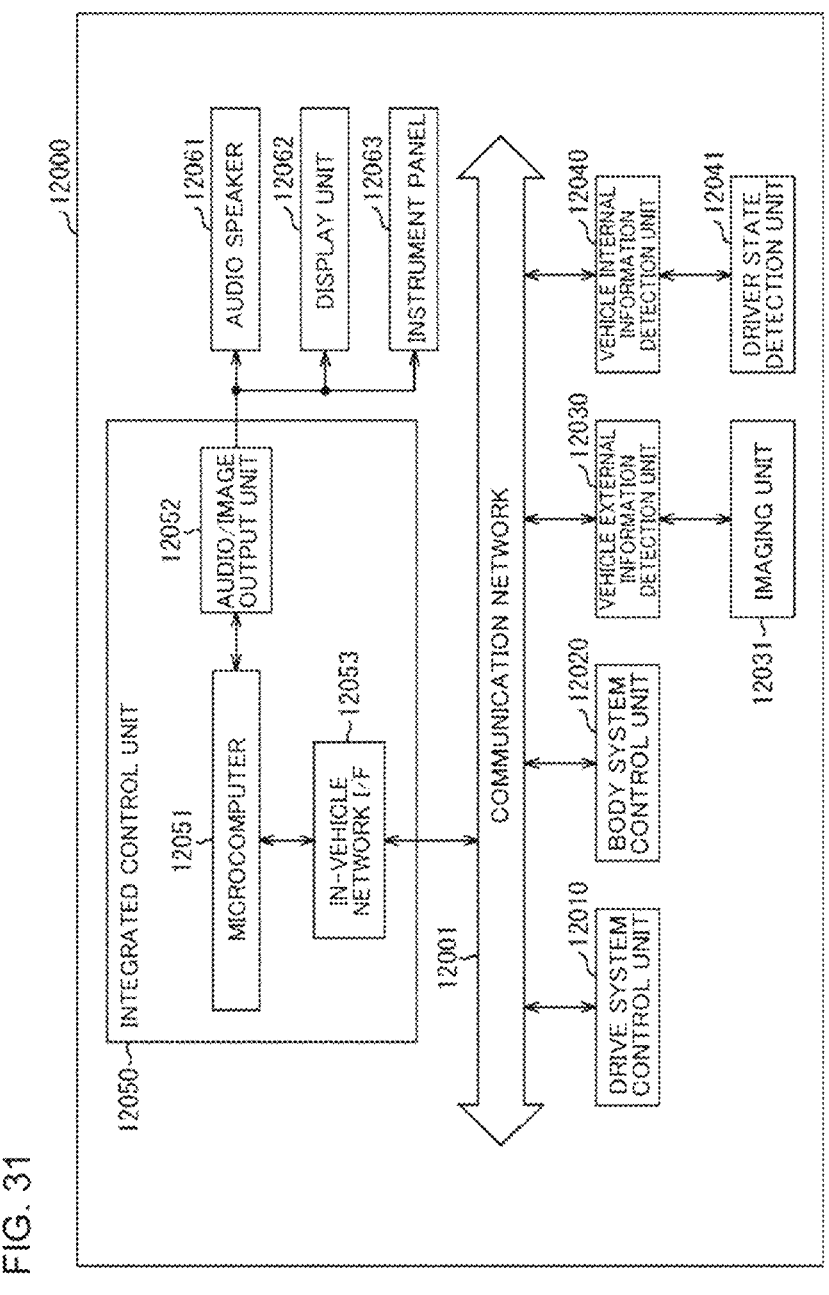
FIG. 31 is a block diagram showing a schematic configuration example of a vehicle control system.

FIG. 31 is a block diagram illustrating a schematic configuration example of a vehicle control system which is an example of a moving object control system to which the technique according to the present disclosure is applicable.

A vehicle control system 12000 includes a plurality of electronic control units connected via a communication network 12001. In the example illustrated in FIG. 31, the vehicle control system 12000 includes a drive system control unit 12010, a body system control unit 12020, a vehicle external information detection unit 12030, a vehicle internal information detection unit 12040, and an integrated control unit 12050. In addition, as a functional configuration of the integrated control unit 12050, a microcomputer 12051, an audio/image output unit 12052, and an in-vehicle network interface (I/F) 12053 are illustrated.

The drive system control unit 12010 controls an operation of an apparatus related to the drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control apparatus such as a braking apparatus that generates a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be inputted to the body system control unit 12020. The body system control unit 12020 receives inputs of the radio waves or signals and controls a door lock device, a power window device, and a lamp of the vehicle.

The vehicle external information detection unit 12030 detects information on the outside of the vehicle having the vehicle control system 12000 mounted therein. For example, an imaging unit 12031 is connected to the vehicle external information detection unit 12030. The vehicle external information detection unit 12030 causes the imaging unit 12031 to capture an image of the outside of the vehicle and receives the captured image. The vehicle external information detection unit 12030 may perform object detection processing or distance detection processing for persons, cars, obstacles, signs, and letters on the road on the basis of the received image.

The imaging unit 12031 is an optical sensor that receives light and outputs an electrical signal according to the amount of the received light. The imaging unit 12031 can also output the electrical signal as an image or information on distance measurement. In addition, the light received by the imaging unit 12031 may be visible light or invisible light such as infrared light.

The vehicle internal information detection unit 12040 detects information on the inside of the vehicle. For example, a driver state detection unit 12041 that detects a state of a driver is connected to the vehicle internal information detection unit 12040. The driver state detection unit 12041 includes, for example, a camera that captures an image of the driver, and the vehicle internal information detection unit 12040 may calculate a degree of fatigue or concentration of the driver or may determine whether or not the driver is dozing on the basis of detection information inputted from the driver state detection unit 12041.

The microcomputer 12051 can calculate a control target value of the driving force generator, the steering mechanism, or the braking device on the basis of vehicle internal or external information acquired by the vehicle external information detection unit 12030 or the vehicle internal information detection unit 12040, and output a control command to the drive system control unit 12010. For example, the microcomputer 12051 can perform cooperative control for the purpose of implementing functions of an ADAS (advanced driver assistance system) including vehicle collision avoidance, impact mitigation, following traveling based on an inter-vehicle distance, vehicle speed maintenance driving, vehicle collision warning, or vehicle lane deviation warning.

Furthermore, the microcomputer 12051 can perform cooperative control for the purpose of automated driving or the like in which autonomous travel is performed without depending on operations of the driver, by controlling the driving force generator, the steering mechanism, or the braking device and the like on the basis of information about the surroundings of the vehicle, the information being acquired by the vehicle external information detection unit 12030 or the vehicle internal information detection unit 12040.

In addition, the microcomputer 12051 can output a control command to the body system control unit 12020 on the basis of the information acquired by the vehicle external information detection unit 12030 outside of the vehicle. For example, the microcomputer 12051 can perform cooperative control for the purpose of preventing glare, such as switching from a high beam to a low beam, by controlling the headlamp according to the position of a vehicle ahead or an oncoming vehicle detected by the vehicle external information detection unit 12030.

The audio/image output unit 12052 transmits an output signal of at least one of sound and an image to an output device capable of visually or audibly notifying a passenger or the outside of the vehicle of information. In the example of FIG. 31, an audio speaker 12061, a display unit 12062, and an instrument panel 12063 are illustrated as examples of the output device. The display unit 12062 may include, for example, at least one of an onboard display and a head-up display.

Figure 32:
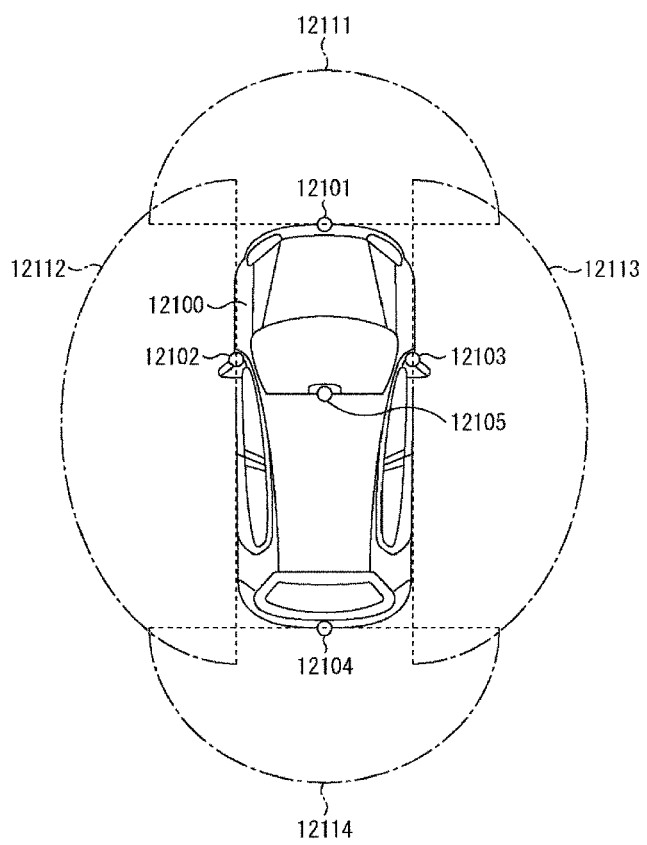
FIG. 32 is an explanatory diagram showing an example of the installation positions of imaging units.

FIG. 32 illustrates an example of the installation position of the imaging unit 12031.

In FIG. 32, imaging units 12101, 12102, 12103, 12104, and 12105 are included as the imaging unit 12031.

The imaging units 12101, 12102, 12103, 12104, and 12105 are provided at positions such as the front nose, the side-view mirrors, the rear bumper, and the back door of the vehicle 12100, and an upper portion of a windshield in the vehicle. The imaging unit 12101 provided on the front nose and the imaging unit 12105 provided in the upper portion of the windshield in the vehicle mainly acquire images ahead of the vehicle 12100. The imaging units 12102 and 12103 provided on the side-view mirrors mainly acquire images on the sides of the vehicle 12100. The imaging unit 12104 provided on the rear bumper or the back door mainly acquires images behind the vehicle 12100. The imaging unit 12105 provided in the upper portion of the windshield in the vehicle is mainly used for detecting, for example, vehicles ahead, pedestrians, obstacles, traffic signals, traffic signs, or lanes.

FIG. 32 illustrates an example of the imaging ranges of the imaging units 12101 to 12104. An imaging range 12111 indicates an imaging range of the imaging unit 12101 provided on the front noise, imaging ranges 12112 and 12113 indicate imaging ranges of the imaging units 12102 and 12103 provided on the side mirrors, and an imaging range 12114 indicates an imaging range of the imaging unit 12104 provided on the rear bumper or the back door. For example, by superimposing image data captured by the imaging units 12101 to 12104, a bird's-eye view image of the vehicle 12100 is obtained.

At least one of the imaging units 12101 to 12104 may have the function of obtaining distance information. For example, at least one of the imaging units 12101 to 12104 may be a stereo camera including a plurality of imaging elements or may be an imaging element that has pixels for phase difference detection.

For example, the microcomputer 12051 can extract, particularly, a closest three-dimensional object on a path along which the vehicle 12100 is traveling, which is a three-dimensional object traveling at a predetermined speed (for example, 0 km/h or higher) in the substantially same direction as the vehicle 12100, as a vehicle ahead by acquiring a distance to each three-dimensional object in the imaging ranges 12111 to 12114 and a temporal change of the distance (a relative speed with respect to the vehicle 12100) on the basis of the distance information obtained from the imaging units 12101 to 12104. Furthermore, the microcomputer 12051 can set an inter-vehicle distance to be secured from a vehicle ahead in advance with respect to the vehicle ahead and can perform automated brake control (also including following stop control) or automated acceleration control (also including following start control). In this way, cooperative control can be performed for the purpose of automated driving or the like in which a vehicle autonomously travels without depending on the operations of the driver.

For example, the microcomputer 12051 can extract and classify three-dimensional object data about three-dimensional objects into two-wheeled vehicles, normal vehicles, large vehicles, pedestrians, and other three-dimensional objects such as electric poles on the basis of distance information obtained from the imaging units 12101 to 12104 and can use the three-dimensional object data for automated avoidance of obstacles. For example, the microcomputer 12051 classifies surrounding obstacles of the vehicle 12100 into obstacles visible to the driver of the vehicle 12100 and hardly visible obstacles. The microcomputer 12051 then determines a collision risk indicating the degree of risk of collision with each obstacle. When the collision risk is equal to or higher than a set value and there is a possibility of collision, driving support for collision avoidance can be provided by outputting an alarm to the driver through the audio speaker 12061 or the display unit 12062 or performing forced deceleration or avoidance steering through the drive system control unit 12010.

At least one of the imaging units 12101 to 12104 may be an infrared camera that detects infrared rays. For example, the microcomputer 12051 can recognize a pedestrian by determining the presence or absence of a pedestrian in the captured images of the imaging units 12101 to 12104. Such pedestrian recognition is performed by, for example, the step of extracting feature points in the captured images of the imaging units 12101 to 12104 as infrared cameras and the step of performing pattern matching on a series of feature points indicating an outline of an object to determine whether or not the object is a pedestrian. When the microcomputer 12051 determines that a pedestrian is present in the captured images of the imaging units 12101 to 12104 and the pedestrian is recognized, the audio/image output unit 12052 controls the display unit 12062 such that a square contour line for emphasis is superimposed on the recognized pedestrian. In addition, the audio/image output unit 12052 may control the display unit 12062 such that an icon or the like indicating the pedestrian is displayed at a desired position.

An example of the vehicle control system to which the technique according to the present disclosure can be applied has been described above. The technique according to the present disclosure can be applied to, for example, the vehicle external information detection unit 12030 among the above-described configurations. Specifically, the ranging module 100 of FIG. 1 can be applied to the vehicle external information detection unit 12030. The application of the technique according to the present disclosure to the vehicle external information detection unit 12030 can improve the image quality of a depth map and the safety of the system.

It should be noted that the foregoing embodiments illustrate examples for embodying the present technique, and matters in the embodiments and matters specifying the invention in the claims are correlated with each other. Similarly, the matters specifying the invention in the claims and the matters having the same names in the embodiments of the present technique are correlated with each other. However, the present technique is not limited to the embodiments and can be embodied by applying various modifications to the embodiments without departing from the gist thereof.

The effects described in the present specification are merely examples and are not intended as limiting, and other effects may be obtained.

The present technique can also have the following configurations.

(1) A solid-state imaging element including: a pixel signal generation unit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sample hold circuit that holds the first pixel signal; and a second sample hold circuit that holds the second pixel signal.

(2) The solid-state imaging element according to (1), wherein the first and second sample hold circuits each include:

a first capacitive element;

a second capacitive element with one end connected to the first capacitive element;

a first sampling transistor that opens or closes a path between the connection node of the first and second capacitive elements and the pixel signal generation unit;

a pre-amplification transistor; and a second sampling transistor that opens or closes a path between the other end of the second capacitive element and a predetermined reference voltage.

(3) The solid-state imaging element according to (2), wherein one of the first and second sample hold circuits further includes a reading circuit for sequentially reading the first and second pixel signals, and the first and second sample hold circuits share the reading circuit.

(4) The solid-state imaging element according to (1), wherein the first and second sample hold circuits each include:

a first capacitive element;

a first sampling transistor that opens or closes a path between one end of the first capacitive element and the pixel signal generation unit;

a second capacitive element; and a second sampling transistor that opens or closes a path between one end of the second capacitive element and the pixel signal generation unit.

(5) The solid-state imaging element according to (1), wherein the first and second sample hold circuits each include:

a first capacitive element;

a first sampling transistor that opens or closes a path between one end of the first capacitive element and the pixel signal generation unit;

a second capacitive element; and a second sampling transistor that opens or closes a path between one end of the first capacitive element and one end of the second capacitive element.

(6) The solid-state imaging element according to (1), wherein the first and second sample hold circuits each include:

a first capacitive element with one end connected to the pixel signal generation unit;

a second capacitive element;

a first sampling transistor that opens or closes a path between the other end of the first capacitive element and one end of the second capacitive element; and a second sampling transistor that opens or closes a path between one end of the second capacitive element and a predetermined power supply voltage.

(7) The solid-state imaging element according to (1), wherein the first and second sample hold circuits each include:

first and second capacitive elements with one ends connected in common to the pixel signal generation unit;

a first sampling transistor that opens or closes a path between the other end of the first capacitive element and a predetermined node;

a second sampling transistor that opens or closes a path between the other end of the second capacitive element and the predetermined node; and a third sampling transistor that opens or closes a path between the predetermined node and a predetermined power supply voltage.

(8) The solid-state imaging element according to any one of (1) to (7), further including a vertical scanning circuit that drives a predetermined number of pixels, wherein the pixel signal generation unit and the first and second sample hold circuits are disposed in each of the pixels, and the vertical scanning circuit simultaneously exposes all the pixels, holds the first and second pixel signals, and outputs the first and second pixel signals for each row.

(9) The solid-state imaging element according to (8), wherein the first and second pixel signals each include a reset level and a signal level, and the vertical scanning circuit outputs the reset level before exposure.

(10) The solid-state imaging element according to (8) or (9), wherein the vertical scanning circuit outputs the first and second pixel signals during exposure.

(11) The solid-state imaging element according to (10), further including an exposure time control unit that controls an exposure time on the basis of the first and second pixel signals outputted during exposure.

(12) The solid-state imaging element according to (10) or (11), further including:

an analog-digital converter that performs analog-digital conversion on the first and second pixel signals; and a gain control unit that controls the analog gain of the analog-digital converter on the basis of the first and second pixel signals outputted during exposure.

(13) The solid-state imaging element according to any one of (1) to (12), wherein a part of the pixel signal generation unit is disposed in a first chip, and the other part of the pixel signal generation unit and the first and second sample hold circuits are disposed in a second chip.

(14) The solid-state imaging element according to any one of (1) to (12), wherein a part of the pixel signal generation unit and parts of the first and second sample hold circuits are disposed in a first chip, and the other parts of the first and second sample hold circuits are disposed in a second chip.

(15) The solid-state imaging element according to any one of (1) to (14), wherein the pixel signal generation unit and the first and second sample hold circuits each include a source follower circuit.

(16) The solid-state imaging element according to any one of (1) to (14), wherein the pixel signal generation unit and the first and second sample hold circuits each include a source ground circuit.

(17) The solid-state imaging element according to any one of (1) to (16), wherein the first and second sample hold circuits each include a plurality number of capacitive elements, and each of the capacitive elements is one of a MIM (Metal-Insulator-Metal) capacitor, a MOM (Metal-Oxide-Metal) capacitor, a MOS (Metal-Oxide-Semiconductor) capacitor, a DRAM (Dynamic Random Access Memory) cell capacitor, and CDTI (Capacitive Deep Trench Isolation).

(18) A method for controlling a solid-state imaging element, the method including: a pixel signal generation step of generating a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sampling and holding step of holding the first pixel signal by a first sample hold circuit; and a second sampling and holding step of holding the second pixel signal by a second sample hold circuit.

(19) An electronic device including: a pixel signal generation unit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sample hold circuit that holds the first pixel signal;

a second sample hold circuit that holds the second pixel signal; and a ranging operation unit that generates distance information on the basis of the first and second pixel signals.

REFERENCE SIGNS LIST

100 Ranging module
110 Light emitting unit
120 Light emission control unit
130 Ranging operation unit
200 Solid-state imaging element
201 Upper chip
202 Lower chip
211 Vertical scanning circuit
212 Horizontal scanning circuit
220 Pixel array part
231 DAC
232 ADC
233 Switch
234 Comparator
235 Counter
251 Signal amount prediction circuit
252 Proper gain calculation circuit
253 Exposure amount calculation circuit
254 Output level adjusting circuit
255 Signal processing circuit
256 Frame memory
300 Pixel
310 Pixel signal generation unit
311 Discharge transistor
312 Photoelectric conversion element
313, 314 Transfer transistor
315, 316 Pre-reset transistor
317, 318 Conversion efficiency control transistor
319, 320 Floating diffusion layer
321, 322 Pre-amplification transistor
323, 324 Pre-current source transistor
340, 360 Sample hold circuit
341, 342, 361, 362 Capacitive element
350 Reading circuit
351, 352, 353, 371, 372, 373 Sampling transistor
354, 357, 374, 377 Post-amplification transistor
355, 358, 375, 378 Selection transistor
356, 359, 376, 379 Post-current source transistor
501 Circuit
502 Microlens
503 Pad
12030 Vehicle external information detection unit

The invention claimed is:

1. A solid-state imaging circuit comprising:

a pixel signal generation circuit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sample hold circuit that holds the first pixel signal; and a second sample hold circuit that holds the second pixel signal, wherein the first and second sample hold circuits each include:

a first capacitor;

a second capacitor with one end connected to the first capacitor;

a first sampling transistor that opens or closes a path between a connection node of the first and second capacitors and the pixel signal generation circuit;

a pre-amplification transistor; and a second sampling transistor that opens or closes a path between an other end of the second capacitor and a predetermined reference voltage.

2. The solid-state imaging circuit according to claim 1, wherein one of the first and second sample hold circuits further includes a reading circuit for sequentially reading the first and second pixel signals, and the first and second sample hold circuits share the reading circuit.

3. The solid-state imaging circuit according to claim 1, wherein the first and second sample hold circuits each include:

a first capacitor;

a first sampling transistor that opens or closes a path between one end of the first capacitor and the pixel signal generation circuit;

a second capacitor; and a second sampling transistor that opens or closes a path between one end of the second capacitor and the pixel signal generation circuit.

4. A solid-state imaging circuit comprising:

a pixel signal generation circuit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sample hold circuit that holds the first pixel signal; and a second sample hold circuit that holds the second pixel signal, wherein the first and second sample hold circuits each include:

a first capacitor;

a first sampling transistor that opens or closes a path between one end of the first capacitor and the pixel signal generation circuit;

a second capacitor; and a second sampling transistor that opens or closes a path between one end of the first capacitor and one end of the second capacitor.

5. A solid-state imaging circuit comprising:

a pixel signal generation circuit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sample hold circuit that holds the first pixel signal; and a second sample hold circuit that holds the second pixel signal, wherein the first and second sample hold circuits each include:

a first capacitor with one end connected to the pixel signal generation circuit;

a second capacitor;

a first sampling transistor that opens or closes a path between an other end of the first capacitor and one end of the second capacitor; and a second sampling transistor that opens or closes a path between one end of the second capacitor and a predetermined power supply voltage.

6. The solid-state imaging circuit according to claim 1, wherein the first and second sample hold circuits each include:

first and second capacitive capacitors with one ends connected in common to the pixel signal generation circuit;

a first sampling transistor that opens or closes a path between the other end of the first capacitor and a predetermined node;

a second sampling transistor that opens or closes a path between the other end of the second capacitor and the predetermined node; and a third sampling transistor that opens or closes a path between the predetermined node and a predetermined power supply voltage.

7. The solid-state imaging circuit according to claim 1, further comprising a vertical scanning circuit that drives a predetermined number of pixels, wherein the pixel signal generation circuit and the first and second sample hold circuits are disposed in each of the pixels, and the vertical scanning circuit simultaneously exposes all the pixels, holds the first and second pixel signals, and outputs the first and second pixel signals for each row.

8. The solid-state imaging circuit according to claim 7, wherein the first and second pixel signals each include a reset level and a signal level, and the vertical scanning circuit outputs the reset level before exposure.

9. The solid-state imaging circuit according to claim 7, wherein the vertical scanning circuit outputs the first and second pixel signals during exposure.

10. A solid-state imaging circuit comprising:

a pixel signal generation circuit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sample hold circuit that holds the first pixel signal;

a vertical scanning circuit that drives a predetermined number of pixels, wherein the pixel signal generation circuit and the first and second sample hold circuits are disposed in each of the pixels, the vertical scanning circuit simultaneously exposes all the pixels, holds the first and second pixel signals, and outputs the first and second pixel signals for each row, and the vertical scanning circuit outputs the first and second pixel signals during exposure; and a second sample hold circuit that holds the second pixel signal an exposure time control circuit that controls an exposure time based upon the first and second pixel signals outputted during exposure.

11. A solid-state imaging circuit comprising:

a pixel signal generation circuit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sample hold circuit that holds the first pixel signal;

a vertical scanning circuit that drives a predetermined number of pixels, wherein the pixel signal generation circuit and the first and second sample hold circuits are disposed in each of the pixels, the vertical scanning circuit simultaneously exposes all the pixels, holds the first and second pixel signals, and outputs the first and second pixel signals for each row, and the vertical scanning circuit outputs the first and second pixel signals during exposure;

an analog-digital converter that performs analog-digital conversion on the first and second pixel signals; and a gain control circuit that controls an analog gain of the analog-digital converter based upon the first and second pixel signals outputted during exposure.

12. The solid-state imaging circuit according to claim 1, wherein a first part of the pixel signal generation circuit is disposed in a first chip, and a second part of the pixel signal generation circuit and the first and second sample hold circuits are disposed in a second chip.

13. A solid-state imaging circuit comprising:

a pixel signal generation circuit that generates a first pixel signal corresponding to an amount of charge transferred from a photoelectric conversion element to a first floating diffusion layer and a second pixel signal corresponding to an amount of charge transferred from the photoelectric conversion element to a second floating diffusion layer;

a first sample hold circuit that holds the first pixel signal; and a second sample hold circuit that holds the second pixel signal, wherein a first part of the pixel signal generation circuit and parts of the first and second sample hold circuits are disposed in a first chip, and other parts of the first and second sample hold circuits are disposed in a second chip.

14. The solid-state imaging circuit according to claim 1, wherein the pixel signal generation circuit and the first and second sample hold circuits each include a source follower circuit.

15. The solid-state imaging circuit according to claim 1, wherein the pixel signal generation circuit and the first and second sample hold circuits each include a source ground circuit.

16. The solid-state imaging circuit according to claim 1, wherein the first and second sample hold circuits each include a predetermined number of capacitors, and each of the capacitors is one of a MIM (Metal-Insulator-Metal) capacitor, a MOM (Metal-Oxide-Metal) capacitor, a MOS (Metal-Oxide-Semiconductor) capacitor, a DRAM (Dynamic Random Access Memory) cell capacitor, and CDTI (Capacitive Deep Trench Isolation).

17. An electronic device comprising the solid-state imaging circuit according to claim 1.

18. An electronic device comprising the solid-state imaging circuit according to claim 4.

19. An electronic device comprising the solid-state imaging circuit according to claim 5.

20. An electronic device comprising the solid-state imaging circuit according to claim 13.

* * * * *